United States Patent
Zhang et al.

(10) Patent No.: US 12,199,519 B2
(45) Date of Patent: Jan. 14, 2025

(54) METHOD FOR OPERATING A CURRENT SOURCE CONVERTER, CONTROL CIRCUIT, AND CURRENT SOURCE CONVERTER

(71) Applicant: Infineon Technologies Austria AG, Villach (AT)

(72) Inventors: Daifei Zhang, Zurich (CH); Jonas Emanuel Huber, Aarau (CH); Johann Walter Kolar, Zurich (CH); Neha Nain, Zurich (CH)

(73) Assignee: Infineon Technologies Austria AG, Villach (AT)

( * ) Notice: Subject to any disclaimer, the term of this patent is extended or adjusted under 35 U.S.C. 154(b) by 255 days.

(21) Appl. No.: 17/967,588

(22) Filed: Oct. 17, 2022

(65) Prior Publication Data

US 2023/0138129 A1   May 4, 2023

(30) Foreign Application Priority Data

Nov. 2, 2021  (EP) .................................... 21206098

(51) Int. Cl.
| | |
|---|---|
| *H02M 5/458* | (2006.01) |
| *H02M 1/00* | (2007.01) |
| *H02M 7/5387* | (2007.01) |

(52) U.S. Cl.
CPC ....... *H02M 5/4585* (2013.01); *H02M 1/0054* (2021.05); *H02M 1/0003* (2021.05); *H02M 1/0087* (2021.05); *H02M 7/53875* (2013.01)

(58) Field of Classification Search
CPC ............. H02M 1/0003; H02M 1/0054; H02M 1/0087; H02M 5/458; H02M 5/4585; H02M 7/5387–53876; H02M 7/5388–5395
See application file for complete search history.

(56) References Cited

U.S. PATENT DOCUMENTS

2015/0091484 A1*  4/2015  Royak ..................... H02P 21/06
                                                        318/400.26
2018/0091061 A1*  3/2018  Sakakibara ............. H02M 1/08
(Continued)

OTHER PUBLICATIONS

Amorim Torres et al., "Current-Source Inverter Integrated Motor Drives Using Dual-Gate Four-Quadrant Wide-Bandgap Power Switches," in IEEE Trans Ind App, vol. 57, No. 5, pp. 5183-5198, Sep.-Oct. 2021, doi: 10.1109/TIA.2021.3096179. Obtained on Sep. 3, 2024. (Year: 2021).*

(Continued)

*Primary Examiner* — Fred E Finch, III
(74) *Attorney, Agent, or Firm* — Armis IP Law, LLC

(57) ABSTRACT

Disclosed is a method and apparatus. The method includes detecting an operating state of a current source converter that comprises a current source rectifier (1), a current source inverter (2), and an inductor circuit (3) connected between an output (p, n) of the current source rectifier (1) and an input (q, r) of the current source inverter (2); and dependent on the detected operating state, operating the current source converter in a first operating mode or a second operating mode. Operating the current source converter in the first operating mode comprises operating the current source rectifier (1) in a 2/3 mode and operating the current source inverter in a 3/3 mode, and operating the current source converter in the second operating mode comprises operating the current source inverter (2) in the 2/3 mode and operating the current source rectifier in the 3/3 mode.

15 Claims, 14 Drawing Sheets

(56) References Cited

U.S. PATENT DOCUMENTS

2020/0328698 A1* 10/2020 Deboy ............... H02M 7/48
2023/0238876 A1*  7/2023 Zhang ............... H02M 3/158
                                              318/504
2024/0014749 A1*  1/2024 Mauger ............. H02M 7/4826

OTHER PUBLICATIONS

Baumann, Martina, et al., "A Novel Control Concept for Reliable Operation of a Three-Phase Three-Switch Buck-Type Unity-Power-Factor Rectifier With Integrated Boost Output Stage Under Heavily Unbalanced Mains Condition", IEEE Transactions on Industrial Electronics, vol. 52, No. 2, Apr. 2005, pp. 399-409.
Guacci, Mattia, et al., "Three-Phase Two-Third-PWM Buck-Boost Current Source Inverter System Employing Dual-Gate Monolithic Bidirectional GaN e-FETs", CPSS Transactions on Power Electronics and Applications, vol. 4, No. 4, Dec. 2019, pp. 339-354.
Lei, Qin, et al., "Space Vector Pulsewidth Amplitude Modulation for a Buck-Boost Voltage/Current Source Inverter", IEEE Transactions on Power Electronics, vol. 29, No. 1, Jan. 2014, pp. 266-274.
Lei, Qin, et al., "Unified Space Vector PWM Control for Current Source Inverter", Nov. 10, 2012, IEEE, pp. 4696-4702.
Wang, Han, et al., "DC-Link Current Optimal Control of Current Source Converter in DEIG", CPSS Transactions on Power Electronics and Applications, vol. 6, No. 2, Jun. 2021, pp. 127-135.
Extended European Search Report, EP 21 206 098.2, Apr. 8, 2022, pp. 1-8.
Guacci Mattia, et al., Novel Three-Phase Two-Third-Modulated Buck-Boost Current Source Inverter System Employing Dual-Gate Monolithic Bidirectional GaN e-FETs, 2019 IEEE 10th International Symposium on Power Electronics for Distributed Generation Systems (PEDG), IEEE, Jun. 3, 2019, pp. 674-683, XP033601862.

* cited by examiner

METHOD FOR OPERATING A CURRENT SOURCE CONVERTER, CONTROL CIRCUIT, AND CURRENT SOURCE CONVERTER

RELATED APPLICATION

This application claims priority to earlier filed European Patent Application Serial Number EP21206098 entitled "METHOD FOR OPERATING A CURRENT SOURCE CONVERTER, CONTROL CIRCUIT, AND CURRENT SOURCE CONVERTER," filed on Nov. 2, 2021, the entire teachings of which are incorporated herein by this reference.

This disclosure relates in general to a method for operating a current source converter.

A current source converter is configured to receive input voltages and input currents from a power source such as, for example, a 3-phase power grid and to provide regulated output currents to a load such as, for example, a motor. There is a need to operate a current source converter in an efficient way.

One example relates to a method. The method includes detecting an operating state of a current source converter that includes a current source rectifier, a current source inverter, and an inductor circuit connected between an output of the current source rectifier and an input of the current source inverter, and, dependent on the detected operating state, operating the current source converter in a first operating mode or a second operating mode. Operating the current source converter in the first operating mode comprises operating the current source rectifier in a 2/3 mode and operating the current source inverter in a 3/3 mode, and operating the current source converter in the second operating mode comprises operating the current source inverter in the 2/3 mode and operating the current source rectifier in the 3/3 mode.

Another example relates to a control circuit. The control circuit is configured to (e.g., operative to) detecting an operating state of a current source converter that includes a current source rectifier, a current source inverter, and an inductor circuit connected between an output of the current source rectifier and an input of the current source inverter, and, dependent on the detected operating state, operating the current source converter in a first operating mode or a second operating mode. Operating the current source converter in the first operating mode comprises operating the current source rectifier in a 2/3 mode and operating the current source inverter in a 3/3 mode, and operating the current source converter in the second operating mode comprises operating the current source inverter in the 2/3 mode and operating the current source rectifier in the 3/3 mode.

Examples are explained below with reference to the drawings. The drawings serve to illustrate certain principles, so that only aspects necessary for understanding these principles are illustrated. The drawings are not to scale. In the drawings the same reference characters denote like features.

Figure 16:
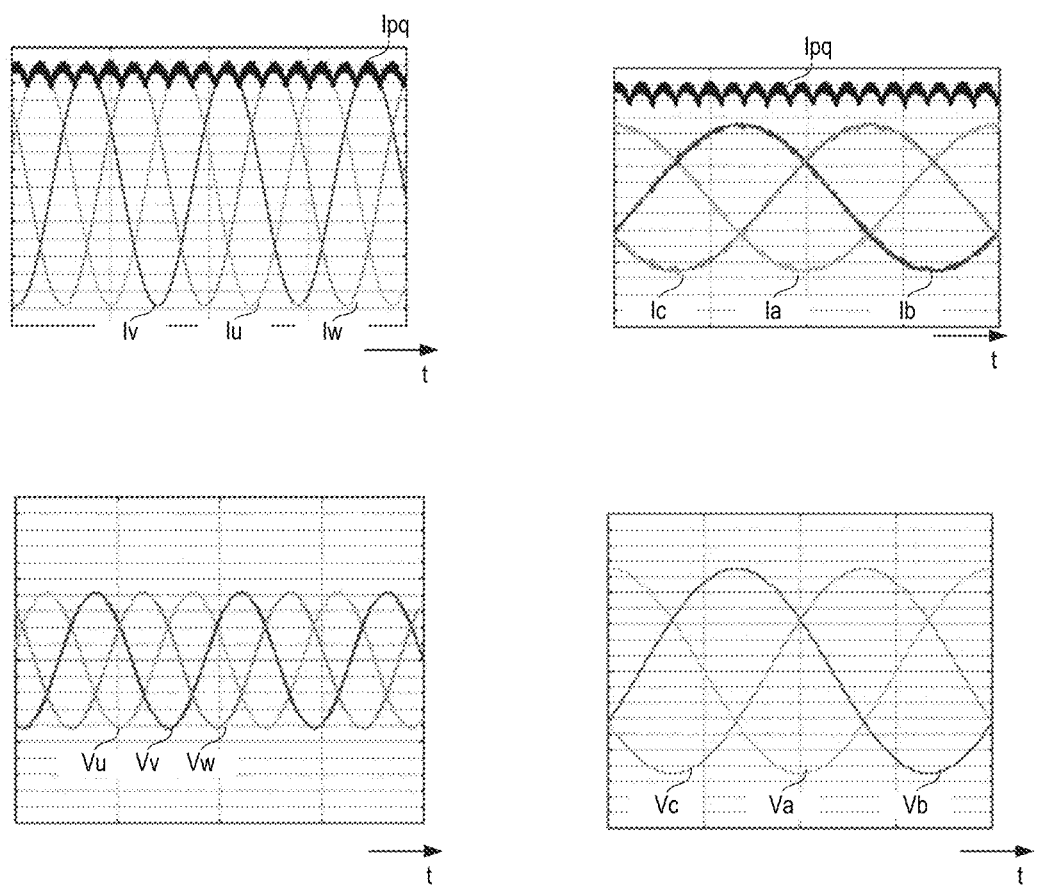
Figure 17:
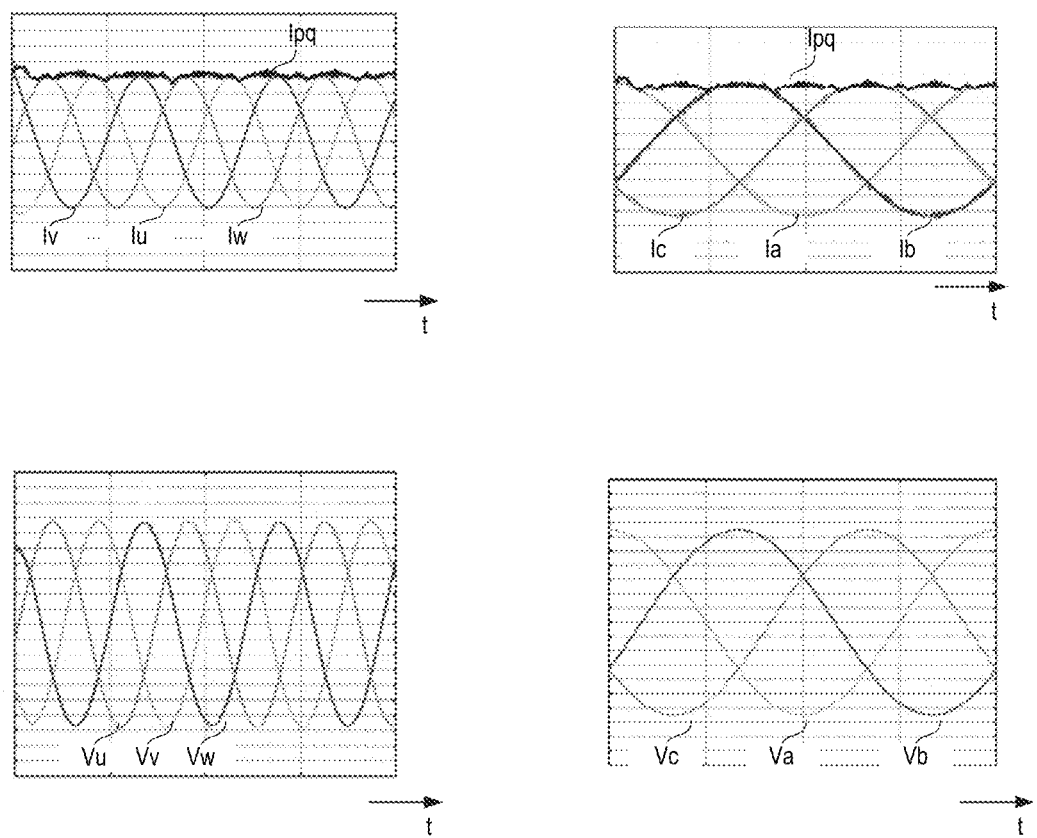

FIG. 16 shows signal diagrams that illustrate operating the current source inverter in the 2/3 mode and the current source rectifier in the 3/3 mode; and FIG. 17 shows signal diagrams that illustrate alternatingly operating the current source rectifier and the current source inverter in the 2/3 and the 3/3 mode.

In the following detailed description, reference is made to the accompanying drawings. The drawings form a part of the description and for the purpose of illustration show examples of how the invention may be used and implemented. It is to be understood that the features of the Various embodiments described herein may be combined with each other, unless specifically noted otherwise.

Figure 1:
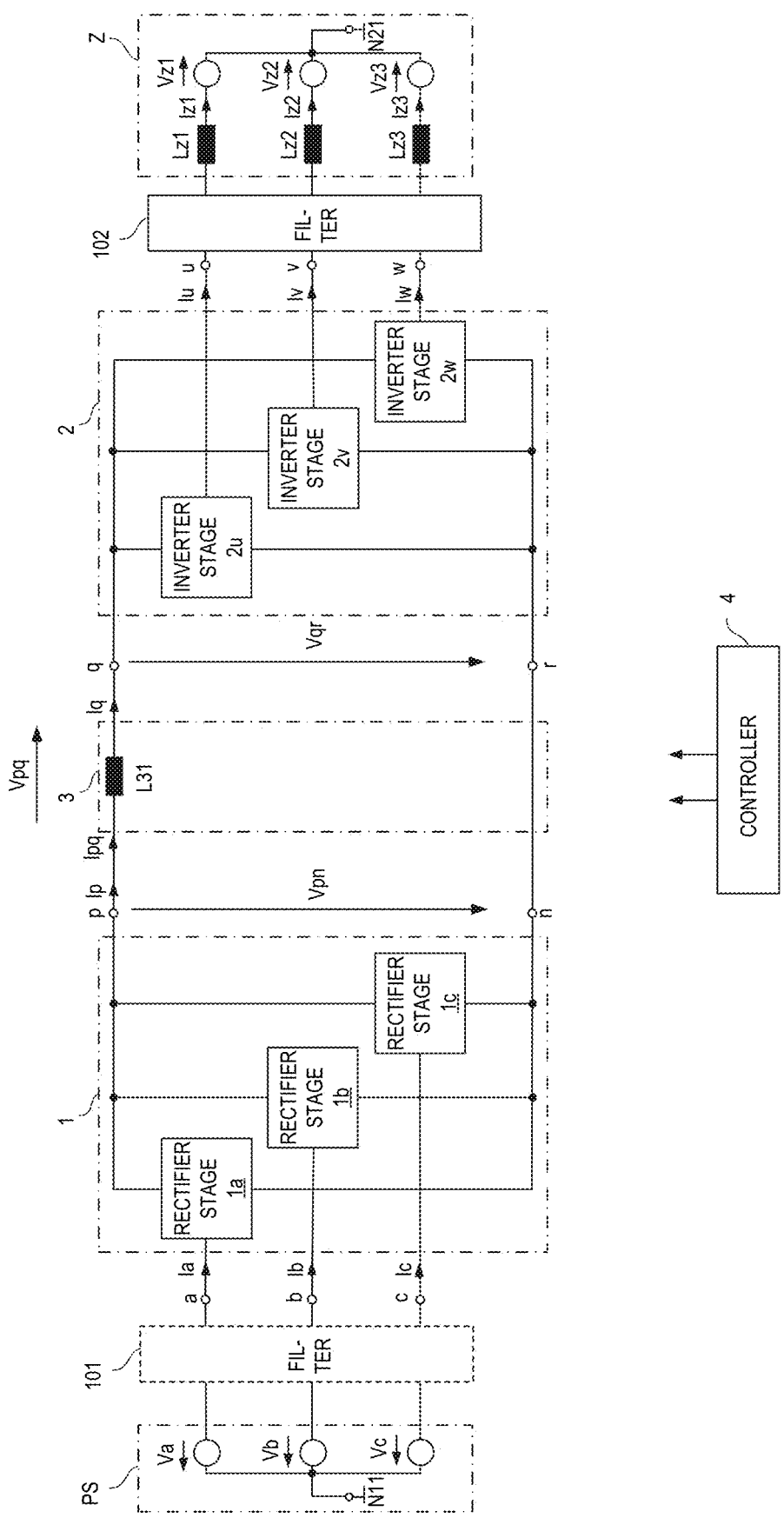
FIG. 1 illustrates one example of a current source converter (CSC) that includes a current source rectifier (CSR), a current source inverter (CSI), and an inductor circuit and that is configured to be connected to a power source and a load.

FIG. 1 shows one example of a current source converter (CSC). The current source converter includes a current source rectifier (CSR) 1, which is briefly referred to as rectifier 1 in the following, a current source inverter (CSI) 2, which is briefly referred to as inverter 2 in the following, and an inductor circuit 3 coupling the rectifier 1 and the inverter 2.

Referring to FIG. 1, the rectifier 1 includes an input with three input nodes a, b, c, an output with two output nodes p, n, and three rectifier stages 1a, 1b, 1c. Each of the rectifier stages 1a, 1b, 1c is connected between a respective one of the input nodes a, b, c and the output nodes p, n. The input nodes a, b, c are configured to be connected to a power source PS, wherein the power source is configured to provide three supply voltages (input voltages) Va, Vb, Vc. These supply voltages may be referenced to a common circuit node N11. Each of the rectifier stages 1a, 1b, 1c is configured to receive a respective one of the input voltages Va, Vb, Vc from the power source PS. Furthermore, each of the rectifier stages 1a, 1b, 1c and is configured to receive a respective input current Ia, Ib, Ic at each of the input nodes a, b, c. Furthermore, the rectifier 1 is configured to provide a rectifier output current Ip and a rectifier output voltage Vpn at the output p, n.

According to one example, the current source converter further includes an input filter 101 (illustrated in dashed lines in FIG. 1) that is configured to be connected between the power source PS and the input nodes a, b, c of the rectifier 1. The input filter 101 is an EMC (electromagnetic compatibility) filter, for example. According to one example, the input filter 101 is configured to provide commutation current paths for the rectifier 1. This is explained herein further below.

Referring to FIG. 1, the inverter 2 includes an input with two input nodes q, r, an output with three output nodes u, v, w, and three inverter stages 2u, 2v, 2w. Each of the inverter stages 2u, 2v, 2w is connected between the input nodes q, r and a respective one of the output nodes u, v, w. The input nodes q, r are configured to receive an inverter input voltage Vqr and an inverter input current Iq. The output nodes u, v, w are configured to be connected to a load Z and are configured to provide respective output currents Iu, Iv, Iw to the load Z. The load Z is a three-phase motor, for example, which includes three inductors Lz1, Lz2, Lz3, wherein each of these inductors Lz1, Lz2, Lz3 is connected between a respective one of the inverter output nodes u, v, w and a common circuit node N21. Voltages Vz1, Vz2, Vz3 inside the load represent a back EMF (electromotive force) of the motor. That is, Vz1, Vz2, Vz3 represent voltages induced in stator windings of the motor Z by a moving rotor field. Currents Iz1, Iz2, Iz3 received by the load Z, that is, currents through the inductors Lz1, Lz2, Lz3 are referred to as load currents in the following.

According to one example, the current source converter further includes an output filter 102 (illustrated in dashed lines in FIG. 1) that is configured to be connected between the output nodes u, v, w of the inverter 2 and the load Z. The output filter 102 is an EMC (electromagnetic compatibility) filter, for example. According to one example, the input filter 101 is configured to provide commutation current paths for the rectifier 1. This is explained herein further below.

Figure 8:
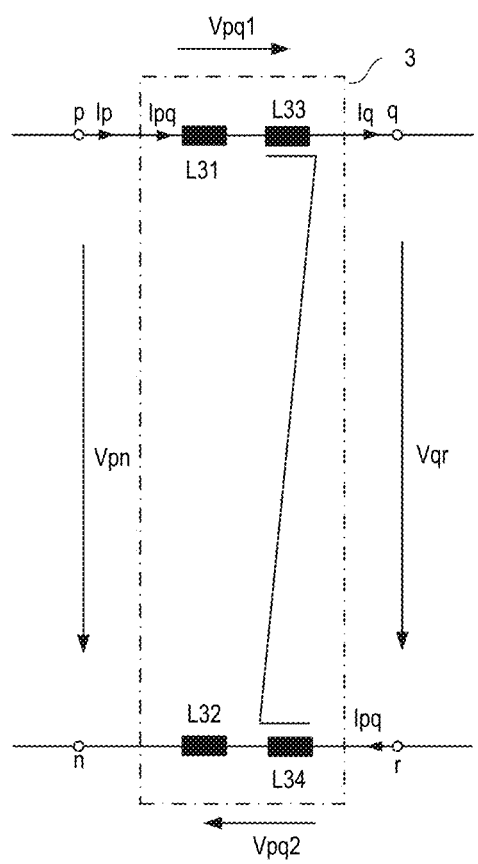
FIG. 8 illustrates a further example of the inductor circuit.

The inductor circuit 3 is connected between the output nodes p, n of the rectifier 1 and the input nodes q, r of the inverter 2 and includes at least one inductor L31. In the example shown in FIG. 1, the inductor circuit 3 includes one inductor L31 that is connected between a first one p of the output nodes p, n of the rectifier 1 and a first one q of the input nodes q, r of the inverter 2. This, however, is only an example. According to another example (not shown), the inductor 31 is connected between a second one n of the output nodes p, n of the rectifier 1 and a second one r of the input nodes q, r of the inverter 2. A further example of the inductor circuit is illustrated in FIG. 8 and explained herein further below.

A voltage Vpq across the inductor circuit 3 is referred to as inductor voltage in the following. Due to the rectifier 1 and the inverter 2 being coupled by the inductor circuit 3, the inverter input voltage Vqr is given by the rectifier output voltage Vpn minus the inductor voltage Vpq, and the rectifier output current Ip equals the inverter input current Iq, $$Vqr = Vpn - Vpq \tag{1a}$$

$$Ip = Iq. \tag{1b}$$

Referring to FIG. 1, the current source converter further includes a control circuit (controller) 4 that is configured to control operation of the current source converter. More specifically, the controller 4 is configured to control operation of the rectifier 1 and the inverter 2. Details regarding the controller 4 are explained herein further below.

Figure 2:
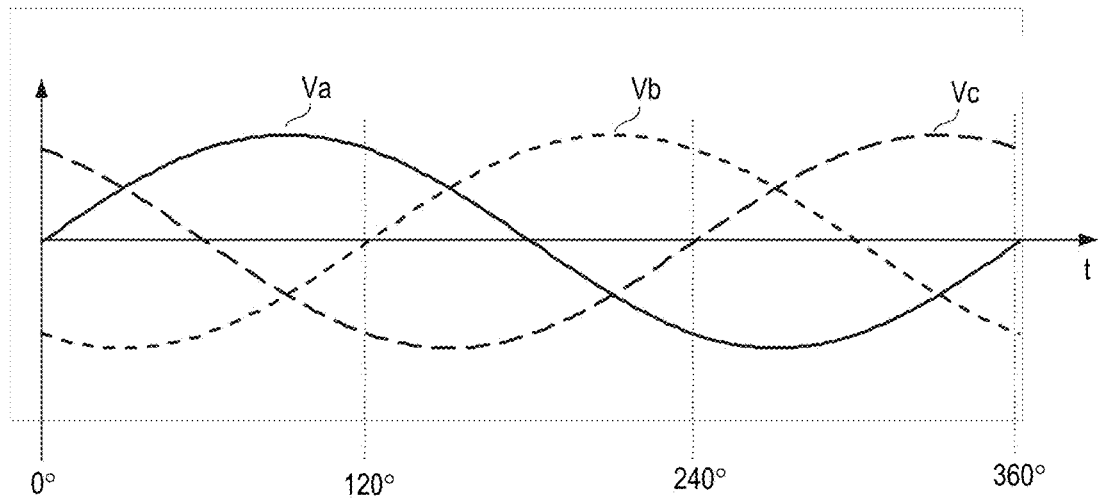
FIG. 2 shows signal diagrams of input voltages provided by the power source to the current source converter according to one example.

According to one example, the input voltages Va, Vb, Vc received by the current source converter are alternating input voltages such as sinusoidal input voltages. FIG. 2 shows signal diagrams of sinusoidal input voltages Va, Vb, Vc during one period of each of these input voltages Va, Vb, Vc. A phase shift between each pair of these input voltages Va, Vb, Vc is 120° (2π/3) in this example. Input voltages (supply voltages) Va, Vb, Vc of the type illustrated in FIG. 2 may be provided by any kind of 3-phase power source or 3-phase power grid. RMS values and amplitudes of the alternating voltages Va, Vb, Vc are dependent on type of power source and may vary between about 156V ($110V_{RMS}$) and 325V ($230V_{RMS}$), for example. The same applies to a frequency of the alternating voltages Va, Vb, Vc, which may vary between 67 Hz and 60 Hz, for example.

The input currents Ia, Ib, Ic may be regulated to have the same waveforms as the input voltages Va, Vb, Vc, so that the input currents Ia, Ib, Ic may be alternating currents that have the same frequency as the input voltages Va, Vb, Vc and the same phase difference. Each of the input currents Ia, Ib, Ic may be in phase with a respective one of the input voltages Va, Vb, Vc. In this case, the current source converter acts like a resistive load. Alternatively, there may be a given phase difference between each of the input currents Ia, Ib, Ic and the respective one of the input voltages Va, Vb, Vc. The latter is equivalent to feeding reactive power into the power source (power grid) PS. Amplitudes of the input currents Ia, Ib, Ic may vary dependent on a power consumption of the load Z. Examples for regulating the input currents Ia, Ib, Ic are explained in detail herein further below.

In the example shown in FIG. 1, the power source PS includes three voltage sources (power sources) connected in a star configuration, so that the input voltages (supply voltages) Va, Vb, Vc are referenced to the same circuit node N11. This, however, is only an example. According to another example (not illustrated), the power source PS includes voltage sources connected in a delta configuration, wherein each of the voltage sources is connected between a respective pair of the input nodes a, b, c of the rectifier or a respective pair of circuit nodes of the input filter 101.

The output current Ip of the rectifier 1 and the input current Iq of the inverter 2 is a direct current. Current levels of these currents may vary dependent on a power consumption of the load Z, for example. Equivalently, the output voltage Vpn of the rectifier 1 and the input voltage Vqr of the inverter 2 is a direct voltage. Basically, the current source converter may be operated (1) such that power is transmitted from the power source PS to the load, or (2) such that power is transmitted from the load Z to the power source (e.g., recuperation power generated in a motor). In each of these operating modes, the output and input currents Iq, Ip have a respective polarity that does not change. In the first case (1), the currents Ip, Iq may flow as indicated in FIG. 1, in the second case (2), the currents Ip, Iq may flow in the opposite direction as indicated in FIG. 1. For the purpose of explanation, only the operating mode in which power is transferred from the power source PS to the load Z is explained in the following. Alternatively, instead of changing the current direction when transmitting power from the load Z to the power source PS, the current source converter may be operated such that the polarities of the input and output voltages Vpn, Vqr change in order to transmit power from the load Z to the power source PS.

Figure 3:
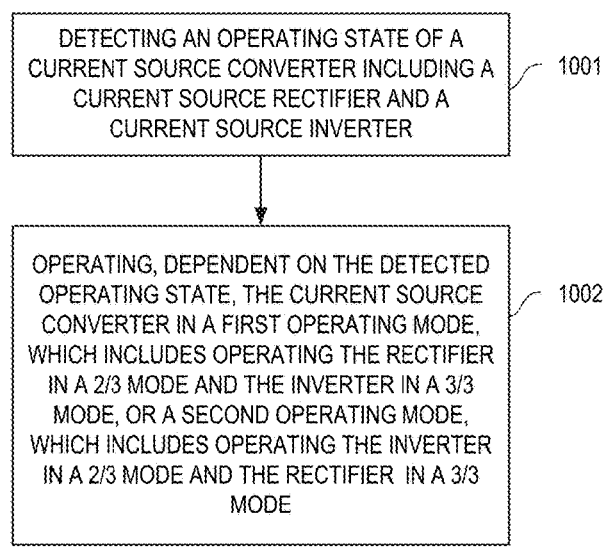
FIG. 3 illustrates one example of a method for operating a current source converter of the type shown in FIG. 1.

FIG. 3 illustrates one example of a method for operating the current source converter according to FIG. 1. Referring to FIG. 3, the method includes detecting an operating state of the current source converter (1001), and, dependent on the detected operating state, operating the current source converter in a first operating mode or a second operating mode (1002). Operating the current source converter in the first operating mode includes operating the rectifier 1 in a 2/3 mode and the inverter 2 in a 3/3 mode, and operating the current source converter in the second operating mode includes operating the inverter 2 in the 2/3 mode and operating the rectifier 1 in the 3/3 mode.

Referring to FIG. 1, the rectifier 1 includes three rectifier stages 1a, 1b, 1c and the inverter 2 includes three inverter stages 2u, 2v, 2w. According to one example, operating the rectifier 1 in the 2/3 mode includes operating two of the three rectifier stages 1a, 1b, 1c in a PWM (pulse-width modulated) mode and operating the other one of the three rectifier stages 1a, 1b, 1c in a static mode. Operating the rectifier 2 in the 3/3 mode includes operating each of the three rectifier stages 1a, 1b, 1c in the PWM mode. Equivalently, operating the inverter 2 in the 2/3 mode includes operating two of the three inverter stages 2u, 2v, 2w in the PWM mode and operating the other one of the three inverter stages 2u, 2v, 2w in a static mode. Operating the inverter 2 in the 3/3 mode includes operating each of the three inverter stages 2u, 2v, 2w in the PWM mode. As compared to operating both the rectifier 1 and the inverter 2 in the 3/3 mode, switching losses can be reduced by operating one of the rectifier 1 and the inverter 2 in the 2/3 mode. This is explained in detail herein further below.

Figure 4:
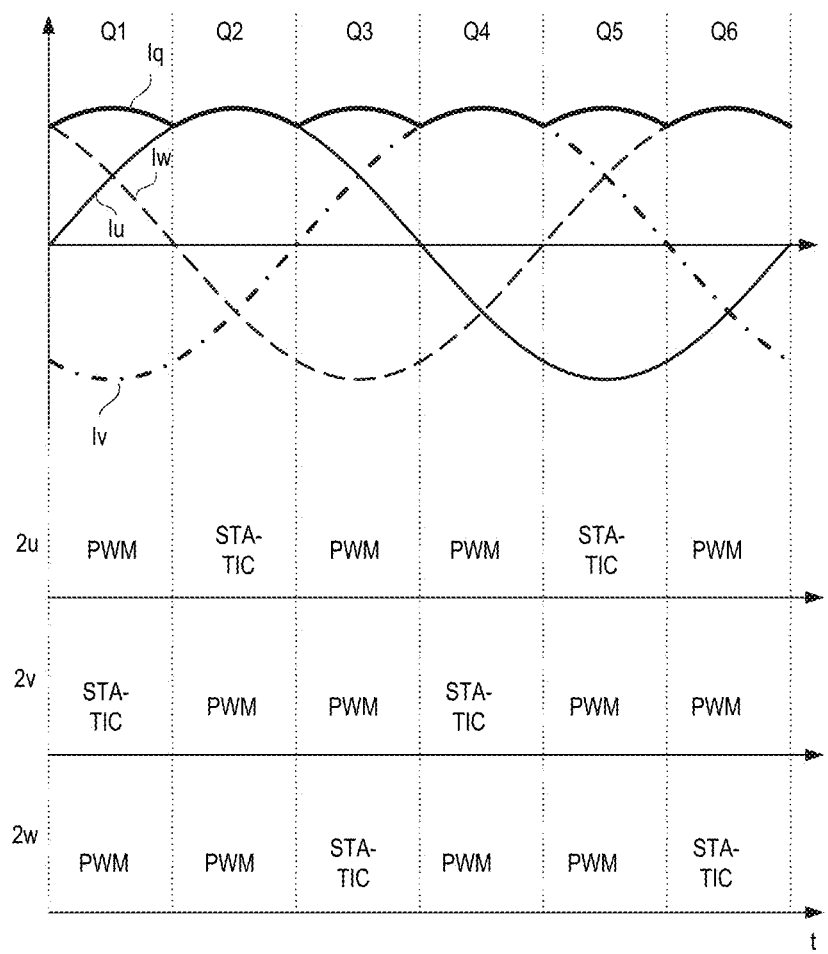
FIG. 4 illustrates one example of a method for operating the current source inverter in a 2/3 mode.

FIG. 4 shows signal diagrams that illustrate one example of a method for operating the inverter 2 in the 2/3 mode. More specifically, FIG. 4 shows signal diagrams of the input current Iq received by the inverter 2 and the output currents Iu, Iv, Iw provided by the inverter 2 to the load Z. Furthermore, FIG. 4 illustrates the operating modes of the inverter stages 2u, 2v, 2w, wherein each of the inverter stages 2u, 2v, 2w is either operated in the PWM mode or the static mode. In the example illustrated in FIG. 4, the output currents Iu, Iv, Iw are regulated such that they are sinusoidal currents that have the same frequency, wherein a phase shift between these currents Iu, Iv, Iw is 120° (2□/3).

FIG. 4 illustrates the output currents Iu, Iv, Iw during one period. It should be noted, that the frequency of the output currents Iu, Iv, Iw can be significantly different from the frequency of the input voltages Va, Vb, Vc and input currents Ia, Ib, Ic. According to one example, the frequency of the output currents Iu, Iv, Iw may range from 0 Hertz (Hz) to about 267 Hz, 670 Hz, or even several kilohertz (kHz).

Referring to FIG. 4, one period of the output currents Iu, Iv, Iw can be subdivided into six time portions or time sections, wherein in each of these sections there is a unique polarity pattern of the output currents Iu, Iv, Iw. That is, the polarity pattern in one of these sections is different from the polarity patterns in the other sections. The "polarity pattern" is defined by the polarities of the output currents Iu, Iv, Iw in the respective section. In a first section Q1, for example, first and third output currents Iu, Iw are positive and the second output current Iv is negative; in a second section Q2, for example, the first output current Iu is positive and the second and third output currents Iv, Iw are negative; in a third section Q3, for example, the first and second output currents Iu, Iv are positive and the third output current Iw is negative, and so on.

In each of the six sections Q1-Q6 the sum of the three currents Iu, Iv, Iw is zero and the sum of the magnitudes of the two currents having the same polarity equals the magnitude of the current having the other polarity. Thus, let Ix and Iy be the two of the output currents Iu, Iv, Iw that have the same polarity and let Iz be the one of the output currents Iu, Iv, Iw that has the opposite polarity, the following applies:

$$|Ix|+|Iy|=|Iz| \qquad (2).$$

In the third section Q3, for example, the sum of the magnitudes of the first and second output currents Iu, Iv, which are positive, equals the magnitude of the third current Iw, which is negative, In addition to the first, second and third output currents Iu, Iv, Iw, FIG. 4 illustrates one example of the input current Iq of the inverter 2. The inverter 2 can be operated in the 2/3 mode when the input current Iq in each of the six sections equals the magnitude of that one of the three output currents Iu, Iv, Iw that currently has the maximum magnitude. That is, the inverter 2 can be operated in the 2/3 mode when the following applies:

$$Iq=\max\{|Iu|,|Iv|,|Iw|\} \qquad (3a),$$

where max {.} denotes a maximum operator the result of which is the maximum of the three values received by the operator (the values between curly brackets). The condition according to equation (3a) can be achieved by regulating the input current Iq of the inverter 2 by the rectifier 1. That is, in order to operate the inverter 2 in the 2/3 mode the rectifier 1 regulates (shapes) the input current Iq received by the inverter 2. This is explained in detail herein further below.

In the following, "highest output current" denotes the one of the output currents Iu, Iv, Iw that (instantaneously) has the highest magnitude. Equivalently, "highest input current" denotes the one of the input currents Ia, Ib, Ic that (instantaneously) has the highest magnitude.

Referring to FIG. 4, operating the inverter 2 in the 2/3 mode includes, in each of the six sections Q1-Q6, operating the inverter stage having the highest output current in the static mode and operating the other two inverter stages in the PWM mode. In the first section Q1, for example, in which the second output current Iv is the highest output current, the second inverter stage 2v is operated in the static mode and the first and third inverter stages 2u, 2w are operated in the PWM mode.

In the same way as the inverter 2 can be operated in the 2/3 mode when the input current Iq equals the magnitude of the highest one of the three output currents Iu, Iv, Iw, the rectifier 2 can be operated in the 2/3 mode when the output current Ip equals the magnitude of the one of the input currents Ia, Ib, Ic that (instantaneously) has the highest magnitude, that is, when the output current Ip equals the highest input current, that is, when the following applies:

$$Ip=\max\{|Ia|,|Ib|,|Ic|\} \qquad (3b),$$

wherein max {.} denotes the maximum operator. The condition according to equation (3b) can be achieved by regulating the output current Ip of the rectifier 1 by the inverter 2. That is, in order to operate the rectifier 1 in the 2/3 mode the inverter 2 regulates (shapes) the output current Ip provided by the rectifier 1. This is explained in detail herein further below.

Figure 5:
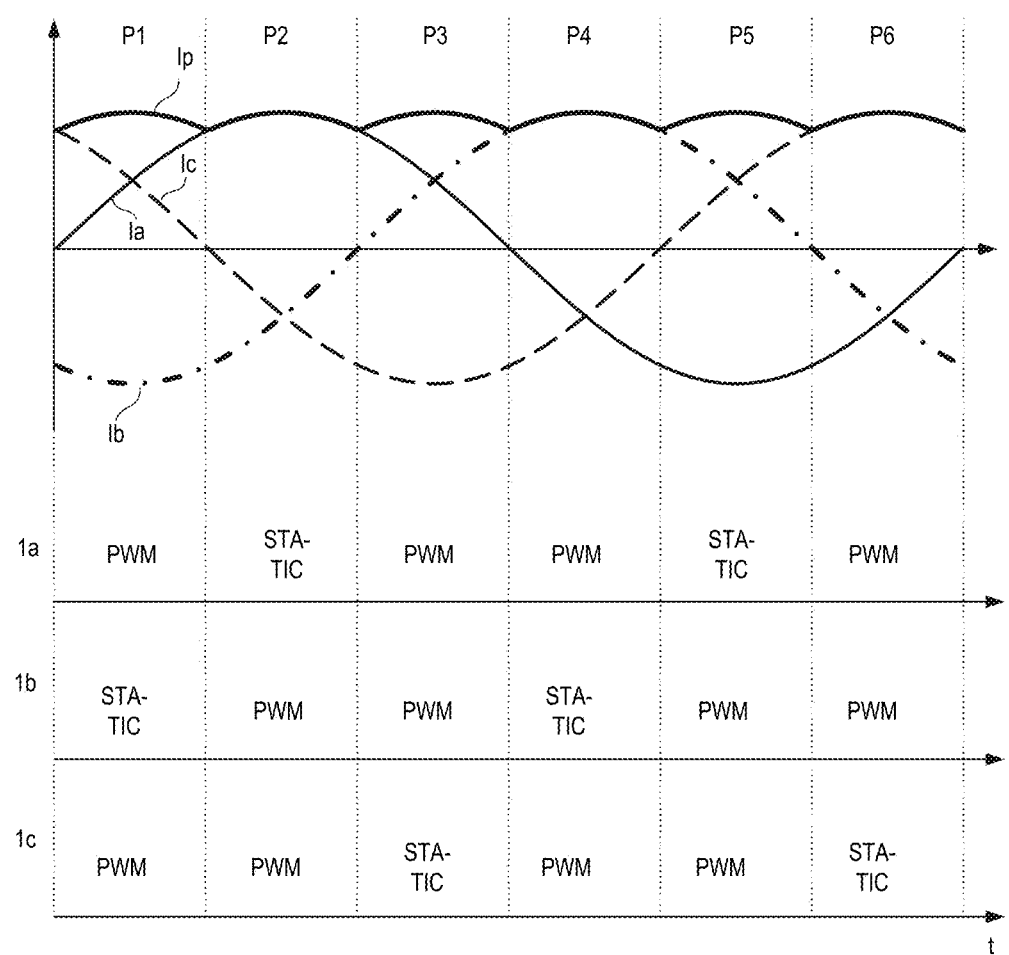
FIG. 5 illustrates one example of a method for operating the current source rectifier in a 2/3 mode.

One example for operating the rectifier 1 in the 2/3 mode is illustrated in FIG. 5. FIG. 5 shows signal diagrams of the input currents Ia, Ib, Ic and the rectifier output current Ip according to one example. Furthermore, operating modes of the rectifier stages 1a, 1b, 1c are illustrated in FIG. 5. The input currents Ia, Ib, Ic are sinusoidal input currents in this example, wherein a phase shift between these currents is 120°. FIG. 5 illustrates one period of the input currents Ia, Ib, Ic.

Referring to FIG. 5, there are six sections P1-P6 with mutually different polarity patterns. In each of these sections, the sum of the three currents Ia, Ib, Ic is zero and the magnitude of the highest one of the input currents Ia, Ib, Ic equals the sum of the magnitudes of the other two of the input currents Ia, Ib, Ic. Thus, equation (2) applies equivalently.

Referring to FIG. 5, operating the rectifier 1 in the 2/3 mode includes, in each of the sections P1-P6, operating the one of the rectifier stages 1a, 1b, 1c that receives the highest input current in the static mode and operating the other two of the rectifier stages in the PWM mode. In a first section, for example, the second rectifier stage 1b receives the highest input current and is therefore operated in the static mode, while the first and third rectifier stages 1a, 1c are operated in the PWM mode.

Figure 6:
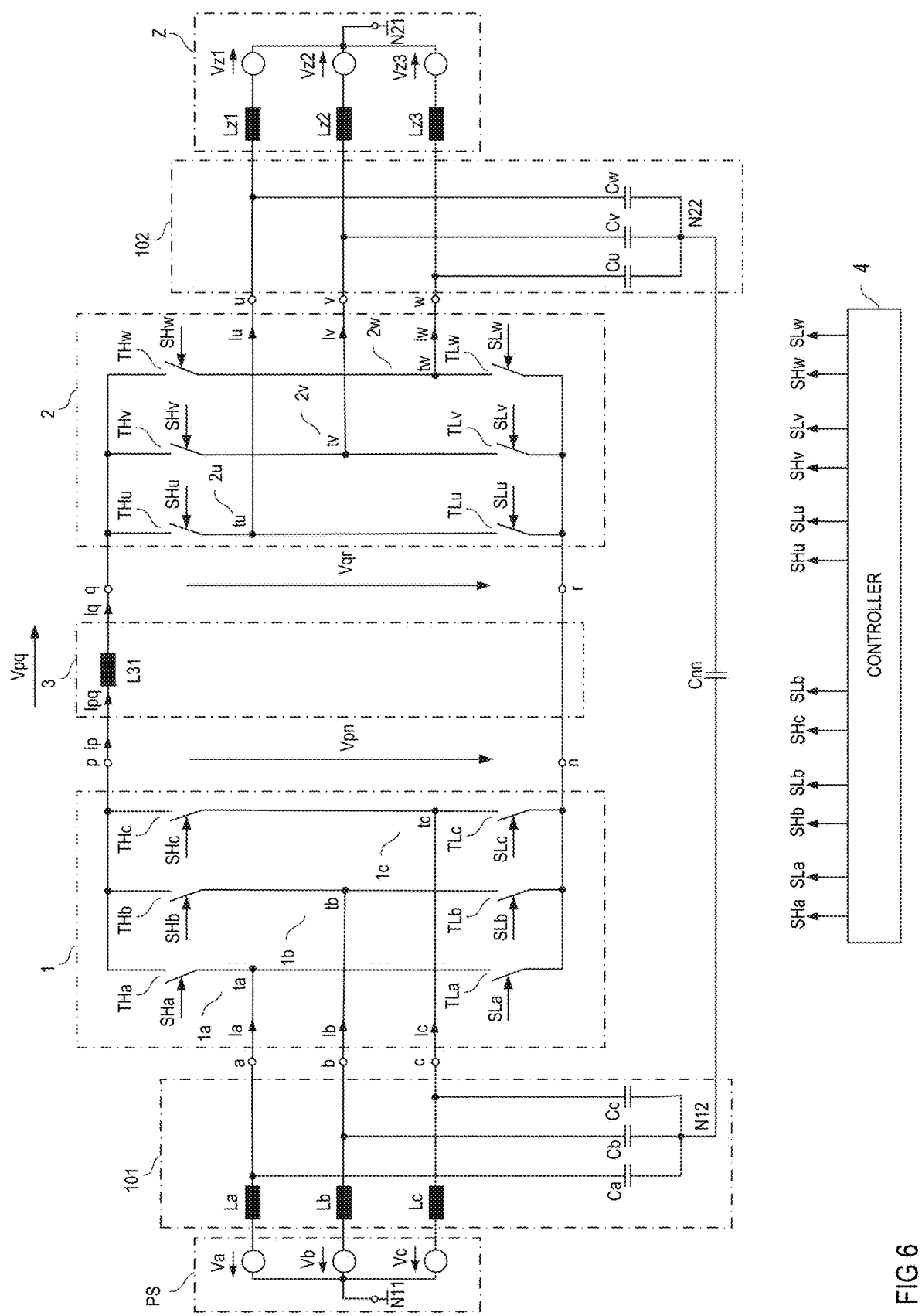
FIG. 6 illustrates examples of the current source rectifier and the current source inverter in greater detail.

FIG. 6 illustrates examples of the rectifier stages 1a, 1b, 1c and the inverter stages 2u, 2v, 2w in greater detail. In this example, each of the rectifier stages 1a, 1b, 1c includes a half bridge with a high-side switch THa, THb, THc and a low-side switch TLa, TLb, TLc. In each of the rectifier stages 1a, 1b, 1c, a tap ta, tb, tc of the half bridge is connected to a respective one of the input nodes a, b, c. In each half-bridge, the tap ta, tb, tc is the circuit node at which the respective high-side switch THa, THb, THc and the respective low-side switch TLa, TLb, TLc are connected. Furthermore, in each of the half bridges, the high-side switch THa, THb, THc is connected in series with the low-side switch TLa, TLb, TLc, wherein the series circuit including the high-side switch THa, THb, THc and the low-side switch TLa, TLb, TLc is connected between the rectifier output nodes p, n.

The input filter 101 may include three filter LC circuits each including a filter inductor La, Lb, Lc and a capacitor Ca, Cb, Cc. Each of the filter inductors La, Lb, Lc is connected between the power source PS and a respective one of the rectifier input nodes a, b, c, and each of the filter capacitors Ca, Cb, Cc is connected between a respective one of the inputs a, b, c and a common circuit node N12. It should be noted that this is only one example of the input filter 101. Any other type of EMC input filter may be used as well.

Each of the three inverter stages 2u, 2v, 2w, includes a half-bridge with a high-side switch THu, THv, THw and a low-side switch TLu, TLv, TLw. In each of the half-bridges of the inverter stages 2u, 2v, 2w the high-side switch THu, THv, THw is connected in series with the low-side switch TLu, TLv, TLw, wherein the series circuits including the high-side switch THu, THv, THw and the low-side switch TLu, TLv, TLw is connected between the input nodes q, r. Each of the half bridges includes a tap tu, tv, tw, which is a circuit node between the high-side switch THu, THv, THw and the low-side switch TLu, TLv, TLw of the respective half bridge. The tap tu, tv, tw of each half bridge is connected to a respective one of the output nodes u, v, w.

Referring to FIG. 6, the output filter 102 may include three capacitors Cu, Cv, Cw, wherein each of these capacitors is connected between a respective one of the output nodes u, v, w and a common circuit node N22. Optionally, the common circuit node N12 of the input filter 101 and the common circuit node N22 of the output filter 102 are coupled. Coupling the common circuit nodes N12, N22 may include connecting a capacitor Cnn (as shown) between the common circuit nodes N12, N22 or may include directly connecting (as shown) the common circuit nodes N12, N22. However, coupling the common circuit nodes N12, N22 is optional. According to another example, there is no connection between the common circuits N12, N22 (except for connections via the rectifier 1 and the inverter 2).

In the example shown in FIG. 6, the power source PS includes three voltage sources connected in a star configuration, wherein each voltage source is coupled to a respective one of the input nodes a, b, c, either directly (when the input filter 101 is omitted) or through a respective one of the filter inductors La, Lb, Lc. However, implementing the power source PS in this way is only an example. According to another example (not shown), the power source includes three voltage sources each connected between a respective pair of the input nodes a, b, c (when the input filter 101 is omitted) or between two of the filter inductors La, Lb, Lc.

In the following, when a differentiation between the individual switches in the rectifier 1 and the inverter 2 is not required, TH denotes an arbitrary one or an arbitrary group of the high-side switches THa, THb, THc, THu, THv, THw and TL denotes an arbitrary one or an arbitrary group of the low-side switches TLa, TLb, TLc, TLu, TLv, TLw.

According to one example, the high-side switches TH and the low-side switches TL are bidirectionally blocking switches, which are electronic switches that can be operated in an on-state and an off-state and which, in the off-state, are capable of blocking a current independent of a polarity of the respective voltage. The bidirectionally blocking switches can be implemented in a conventional way.

Figure 7A:
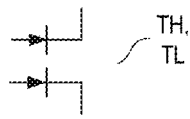
FIGS. 7A and 7B illustrate examples for implementing high-side switches and low-side switches in the current source rectifier and the current source inverter.

According to one example illustrated in FIG. 7A, each bidirectionally blocking switch TH, TL includes a bidirectionally blocking GaN (Gallium Nitride) switch.

Figure 7B:
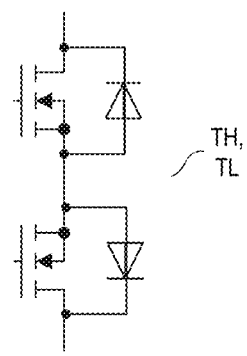

According to another example illustrated in FIG. 7B, each bidirectionally blocking switch includes two MOSFETs (metal oxide semiconductor field-effect transistors), wherein these MOSFETs are connected in series such that integrated body diodes of the MOSFETs are connected in anti-series. For the purpose of illustration, the internal body diodes are represented by diodes connected in parallel with drain source paths of the MOSFETs. Just for the purpose of illustration, the MOSFETs shown in FIG. 7B are n-type MOSFETs that have their source nodes connected. This, however is only an example. Instead of the source nodes the drain nodes could be connected. Furthermore, p-type MOSFETs or even a combination of an n-type MOSFET and a p-type MOSFET may be used as well.

Implementing bidirectionally blocking switches using a GaN switch or two MOSFETs, however, is only an example. Any other conventional way of implementing a bidirectionally blocking electronic switch may be used as well.

Referring to the above, the controller 4 is configured to control operation of the current source converter. In the example according to FIG. 6, this includes controlling operation of the high-side switches TH and the low-side switches TL in the rectifier 1 and the inverter 2. Each of these high-side switches TH and low-side switches TL is configured to receive a respective drive signal SHa, SHb, SHc, SLa, SLb, SLc, SHu, SHv, SHw, SLu, SLv, SLw, which are briefly referred to as drive signals SH, SL in the following. The controller 4 is configured to generate these drive signals SH, SL received by the high-side switches and low-side switches of the rectifier 1 and the inverter 2. The drive signals TH, TL provided by the controller may be logic signals that either have an on-level or an off-level, wherein the on-level indicates that the respective switch is to be switched on and the off-level indicates that the respective switch is to be switched off. In addition, the converter may include drivers that are configured to drive the switches TH, TL based on the drive signals SH, SL. For the ease of illustration, however, such drivers are not illustrated in FIG. 6.

FIG. 8 illustrates another example of the inductor circuit 3. In this example, the inductor circuit 3, in addition to the first inductor 31 connected between the first output node p of the rectifier 1 and the first input node q of the inverter 2, includes a second inductor 32 connected between the second output node n of the rectifier 1 and the second input node r of the inverter 2. Additionally, the inductor circuit 3 may include a third inductor 33 connected in series with the first inductor 31 and a fourth inductor 34 connected in series with the second inductor 32, wherein the third inductor 33 and the fourth inductor 34 are inductively coupled.

In FIG. 8, Vpq1 denotes a voltage across the series circuit including the first and third inductors L31, L33 induced by the current between rectifier output node p and inverter input node q. In the following, a current Ipq flowing from the rectifier 1 to the inverter 2 and being equal to the rectifier output current Ip and the inverter input current Iq is referred to as DC current. Equivalently, Vpq2 denotes a voltage across the series circuit including the second and fourth inductors L32, L34 induced by the DC current between rectifier output node p and inverter input node q. A sum of these voltages Vpq1, Vpq2 equals the inductor voltage Vpq explained above, so that equation (1a) applies accordingly.

Operating a rectifier stage 1a, 1b, 1c of the type illustrated in FIG. 6 in the PWM mode may include operating one of the high-side switch TH and the low-side switch TL in the rectifier stage 1a, 1b, 1c in the PWM mode and operating the other one of the high-side switch TH and the low-side switch TL in the on-state. Equivalently, operating an inverter stage 2u, 2v, 2w of the type illustrated in FIG. 6 in the PWM mode may include operating one of the high-side switch TH and the low-side switch TL in the inverter stage 2u, 2v, 2w in the PWM mode and operating the other one of the high-side switch TH and the low-side switch TL in the off-state.

Figure 9:
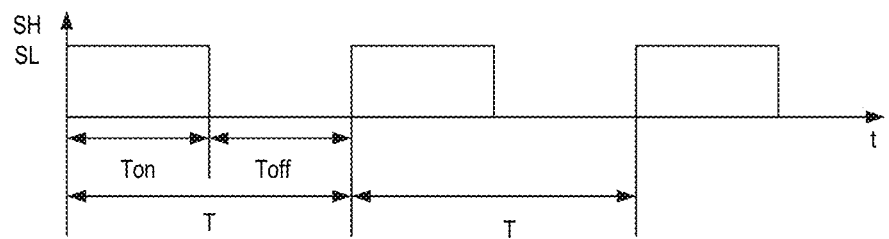
FIG. 9 shows a signal diagram that illustrates operating an electronic switch in a PWM mode.

Referring to FIG. 9, operating a high-side switch TH or a low-side switch TL in the PWM mode includes operating the respective switch in a plurality of successive drive cycles, wherein in each of these drive cycles the respective switch is switched on for an on-time Ton and switched off for an off-time Toff. In FIG. 4, SH, SL denotes the drive signal of any one of the high-side and low-side switches TH, TL that is operated in the PWM mode. For the purpose of illustration, a high-signal level of the drive signal S represents an on-level, which is a signal level that switches on the electronic switch TH, TL, and a low-signal level represents an off-level, which a signal level that switches off the respective electronic switch TH, TL. An overall time duration T of one drive period is given by the on-time Ton plus the off-time Toff, T=Ton+Toff. A duty cycle d is given by the on-time Ton divided by the time period T (d=Ton/T).

The switches TH, TL may be operated at a fixed switching frequency, wherein the duration T of one drive period is the reciprocal of the switching frequency fs (T=1/fs). The switching frequency fs, according to one example, is significantly higher than the frequency of the input voltages Va, Vb, Vc. According to one example, the switching frequency fs is selected from between 10 kHz and several 100 kHz.

Figure 10:
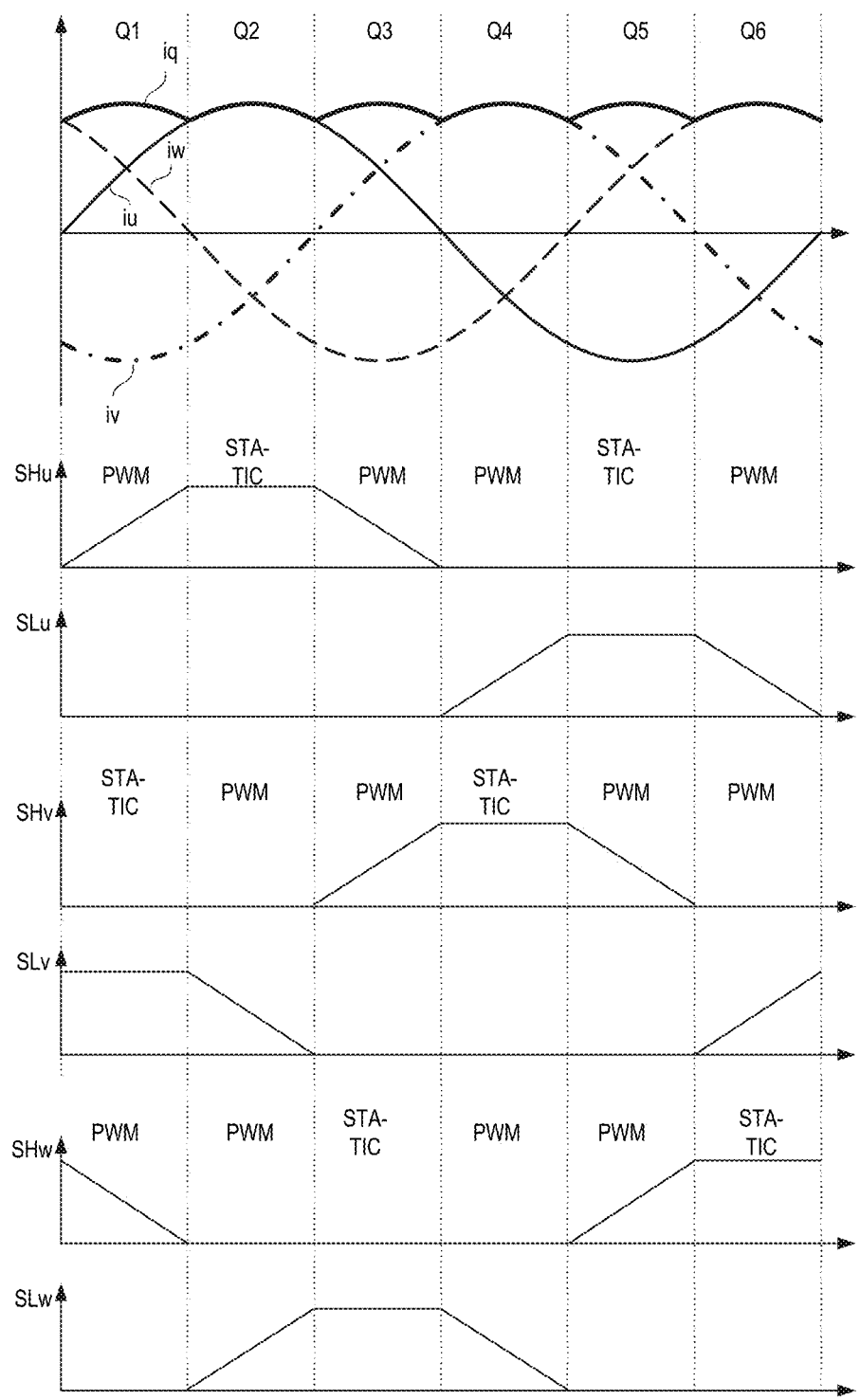
FIG. 10 shows signal diagrams that illustrate operating a current source inverter of the type shown in FIG. 6 in the 2/3 mode.

FIG. 10 shows signal diagrams that are based on the signal diagrams illustrated in FIG. 4 and illustrate one example of operating the inverter 2 according to FIG. 6 in the 2/3 mode. Referring to the above, operating the inverter 2 in the 2/3 mode includes, in each of the six sections Q1-Q6 of one period of the output currents Iu, Iv, Iw, operating the one of the inverter stages 2u, 2v, 2w that provides the highest one of the output currents Iu, Iv, Iw in the static mode and operating the other two of the inverter stages 2u, 2v, 2w in the PWM mode. Referring to FIG. 10, operating an inverter stage 2u, 2v, 2w in the static mode includes operating one of the high-side switch and the low-side of the respective inverter stage 2u, 2v, 2w in the on-state at least for several successive drive cycles and as long as the duration of one section Q1-Q6 and operating the other one of the high-side switch and the low-side of the respective inverter stage 2u, 2v, 2w in the off-state.

Whether the high-side switch TH is switched on and the low-side switch TL is switched off, or the high-side switch TH is switched off and the low-side switch TL is switched on is dependent on the current direction of the highest output current. According to one example, the high-side switch TH is switched on and the low-side switch TL is switched off when the highest output current is positive, and the high-side switch TH is switched off and the low-side switch TL is switched on when the highest output current is negative. This is illustrated in FIG. 10 which, in addition to signal waveforms of the output currents Iu, Iv, Iw and the input current Iq, illustrates the drive signals SHu, SLu, SHv, SLv, SHw, SLw of the high-side and low-side switches THu, TLu. THv, TLv, THw, TLw. In the first section Q1, for example, the second output current Iv provided by the second inverter stage 2v is the highest output current and is negative. Thus, operating the second inverter stage 2v in the static mode includes switching on the low-side switch TLv and switching off the high-side switch THv throughout the first section Q1. In the second section Q2, for example, the first output current Iu provided by the first inverter stage 2u is the highest output current and is positive. Thus, operating the first inverter stage 2u in the static mode includes switching on the high-side switch THu and switching off the low-side switch TLu throughout the second section Q2.

Operating one inverter stage 2u, 2v, 2w in the PWM mode includes operating one of the high-side switch and the low-side of the respective inverter stage 2u, 2v, 2w in the PWM mode and operating the other one of the high-side switch and the low-side of the respective inverter stage 2u, 2v, 2w in the off-state.

Whether the high-side switch TH is operated in the PWM mode and the low-side switch TL is switched off, or the high-side switch TH is switched off and the low-side switch TL is operated in the PWM mode is dependent on the current direction of the current through the respective inverter stage 2u, 2v, 2w. According to one example, the high-side switch TH is operated in the PWM mode and the low-side switch TL is switched off when the respective output current is positive, and the high-side switch TH is switched off and the low-side switch TL is operated in the PWM mode when the respective output current is negative.

In the first section Q1, for example, the third output current Iw provided by the third inverter stage 2w is positive. Thus, operating the third inverter stage 2w in the PWM mode includes operating the high-side switch THw in the PWM mode and switching off the low-side switch TLw throughout the first section Q1. In the second section Q2, for example, the third output current Iw is negative. Thus, operating the third inverter stage 2w in the PWM mode includes switching off the high-side switch THw and operating the low-side switch TLw in the PWM mode throughout the second section Q2.

Instead of signal levels of the drive signals SH, SL, FIG. 10 illustrates the duty cycles of the respective drive signals. As can be seen from FIG. 10, by suitably varying the duty cycles the respective output current Iu, Iv, Iw can be shaped, wherein the magnitude of the respective output current Iu, Iv, Iw increases as the duty cycle increases, and vice versa. Referring to the above, when the inverter 2 is operated in the 2/3 mode, the rectifier 1 operates in the 3/3 mode and shapes the input current Iq received by the inverter 2 such that the input current Iq is in accordance with equation (3a). Thus, the magnitude of the output current of the inverter stage operated in the static mode is (automatically) given by the sum of the magnitudes of the output currents of the two inverter stages operated in the PWM mode.

In inverter stages operated in the PWM mode, the duty cycle of the high-side switch or low-side switch that is operated in the PWM mode is given by the magnitude of the respective output current divided by the input current Iq. Let Ix be the output current of any one 2x of the inverter stages 2u, 2v, 2w that is operated in the PWM mode at any time, then a duty cycle dx of the high-side switch THx of the inverter stage 2x or the low-side switch TLx of the inverter stage 2x is given by $$dx = \frac{|Ix|}{Iq}. \qquad (4)$$

As outlined above, the high-side switch THx is operated in the PWM mode when the output current Ix is positive, and the low-side switch TLx is operated in the PWM mode when the output current Ix is negative.

Referring to the above, operating an inverter stage 2u, 2v, 2w in the PWM mode includes alternatingly switching on and off one of the high-side switch TH and the low-side switch TL of the respective inverter stage 2u, 2v, 2w, while the other one of the high-side switch TH and the low-side switch TL is switched off. Thus, the current from the input q, r to the tap of the respective inverter stage 2u, 2v, 2w does not flow continuously.

Due to the inductor Lz1, Lz2, Lz3 in each of the three branches of the load, a continuous flow of a load current received by each branch may be beneficial in order to avoid a high voltage at the respective output node u, v, w during those times in which both switches TH, TL of the inverter stage 2u, 2v, 2w connected to the respective output node u, v, w are switched off.

The output filter 102 may help to avoid such high voltages. During those time periods in the PWM mode in which both switches TH, TL of a respective inverter stage 2u, 2v, 2w are switched off, the respective capacitor Cu, Cv, Cw takes over the load currents Iz1, Iz2, Iz3 received by the load Z and therefore ensures a continuous flow of current into the load Z. In the first section Q1, for example, in which the first and third inverter stages 2u, 2w are operated in the PWM mode, each capacitor Cu, Cw takes over the respective load current, that is, provides freewheeling path for the load current, during those time periods in which the respective high-side switch THu, THw is switched off.

According to one example, in order to avoid high voltages at the input nodes q, r due to the at least one inductor in the inductor circuit 3, a timing of switching on and switching off the two switches that are operated in the PWM mode is such that at each time in one drive cycle at least one of the two switches is switched on. That is, the duration of the on-time of each of the two switches is given by a respective duty-cycle, and the time instance of switching on the each of the switches switch within one drive cycle is selected such that at each time one of the switches is in an on-state. In the first section Q1, for example, this may be achieved by switching the high-side switches THu and THw of the first and third inverter stages 1u, 1w such that one of the high-switches THu, THw is switched on such that its on-time starts at the beginning of the drive cycle and the other one of the high-switches THu, THw is switched on such that its on-time ends at the beginning of the drive cycle, wherein the on-times overlap in the middle of the drive cycle. Modulation schemes that ensure, in a current source inverter, that from two PWM modulated high-side or low-side switches one of the switches is in a conducting state at each time of a drive cycle are commonly known, so that no further explanation is required in this regard.

It should be noted that the current waveforms of the output currents Iu, Iv, Iw shown in FIG. 10 represent averages of the output currents over one or more drive cycles. Due to the switched mode operation of the inverter stages 2u, 2v, 2w the output currents Iu, Iv, Iw may be discontinuous and may include high frequent ripples.

Figure 11:
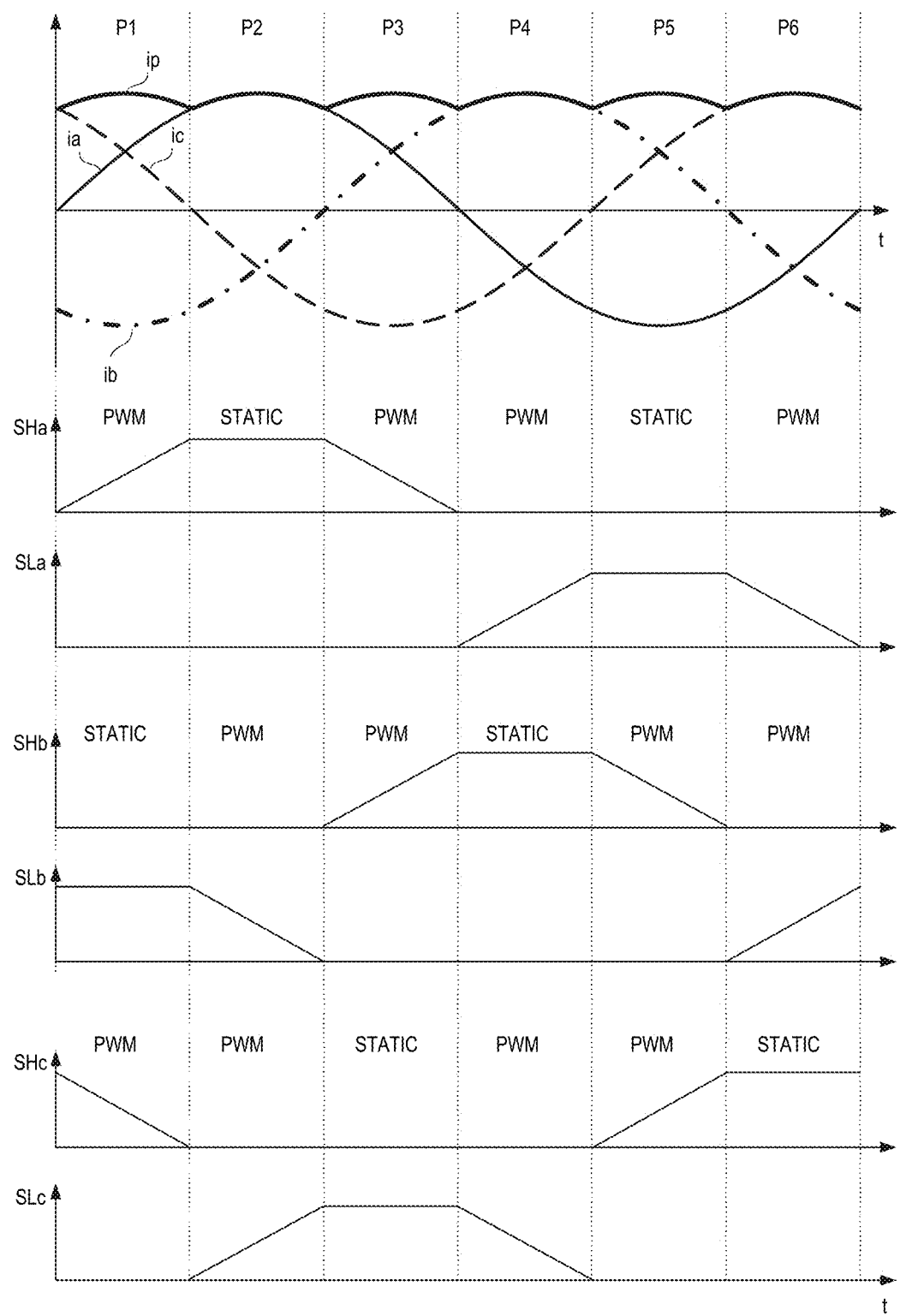
FIG. 11 shows signal diagrams that illustrate operating a current source rectifier of the type shown in FIG. 6 in the 2/3 mode.

FIG. 11 shows signal diagrams that are based on the signal diagrams illustrated in FIG. 5 and illustrate one example of operating the rectifier 1 according to FIG. 6 in the 2/3 mode. Referring to the above, operating the rectifier 1 in the 2/3 mode includes, in each of the six sections P1-P6 of one period of the input currents Ia, Ib, Ic, operating the one of the rectifier stages 1a, 1b, 1c that provides the highest one of the input currents Ia, Ib, Ic in the static mode and operating the other two of the rectifier stages 1a, 1b, 1c in the PWM mode. Referring to FIG. 11, operating a rectifier stage 1a, 1b, 1c in the static mode includes operating one of the high-side switch and the low-side of the respective rectifier stage 1a, 1b, 1c in the on-state at least for several successive drive cycles and as long as the duration of one section P1-P6 and operating the other one of the high-side switch and the low-side of the respective rectifier stage 1a, 1b, 1c in the off-state.

Whether the high-side switch TH is switched on and the low-side switch TL is switched off, or the high-side switch TH is switched off and the low-side switch TL is switched on is dependent on the current direction of the highest output current. According to one example, the high-side switch TH is switched on and the low-side switch TL is switched off when the highest output current is positive, and the high-side switch TH is switched off and the low-side switch TL is switched on when the highest output current is negative. This is illustrated in FIG. 11 which, in addition to signal waveforms of the input currents Ia, Ib, Ic and the output current Ip illustrates the drive signals SHa, SLa, SHb, SLb, SHc, SLc of the high-side and low-side switches THa, TLa, THb, TLb, THc, TLc. In the first section P1, for example, the second input current 1b received by the second rectifier stage 1b is the highest output current and is negative. Thus, operating the second rectifier stage 1b in the static mode includes switching on the low-side switch TLb and switching off the high-side switch THb throughout the first section PL. In the second section P2, for example, the first input current Ia received by the first rectifier stage 1a is the highest output current and is positive. Thus, operating the first rectifier stage 1a in the static mode includes switching on the high-side switch THa and switching off the low-side switch TLa throughout the second section P2.

Operating one rectifier stage 1a, 1b, 1c in the PWM mode includes operating one of the high-side switch and the low-side of the respective rectifier stage 1a, 1b, 1c in the PWM mode and operating the other one of the high-side switch and the low-side of the respective rectifier stage 1a, 1b, 1c in the off-state.

Whether the high-side switch TH is operated in the PWM mode and the low-side switch TL is switched off, or the high-side switch TH is switched off and the low-side switch TL is operated in the PWM mode is dependent on the current direction of the current through the respective rectifier stage 1a, 1b, 1c. According to one example, the high-side switch TH is operated in the PWM mode and the low-side switch TL is switched off when the respective input current is positive, and the high-side switch TH is switched off and the low-side switch TL is operated in the PWM mode when the respective input current is negative.

In the first section P1, for example, the third input current Ic received by the third rectifier stage 1c is positive. Thus, operating the third rectifier stage 1c in the PWM mode includes operating the high-side switch THc in the PWM mode and switching off the low-side switch TLc throughout the first section P1. In the second section P2, for example, the third input current Ic is negative. Thus, operating the third rectifier stage 1c in the PWM mode includes switching off the high-side switch THc and operating the low-side switch TLc in the PWM mode throughout the second section P2.

Instead of signal levels of the drive signals SH, SL, FIG. 11 illustrates the duty cycles of the respective drive signals. As can be seen from FIG. 11, by suitably varying the duty cycles the respective input current Ia, Ib, Ic can be shaped, wherein the magnitude of the respective output current Ia, Ib, Ic increases as the duty cycle increases, and vice versa. Referring to the above, when the rectifier 1 is operated in the 2/3 mode, the inverter 2 operates in the 3/3 mode and shapes the output current Ip drawn from the rectifier 1 such that the output current Ip is in accordance with equation (3b). Thus, the magnitude of the input current of the rectifier stage operated in the static mode is (automatically) given by the sum of the magnitudes of the output currents of the two rectifier stages operated in the PWM mode.

In rectifier stages operated in the PWM mode, the duty cycle of the high-side switch or low-side switch that is operated in the PWM mode is given by the magnitude of the respective input current divided by the output current Ip. Let Iy be the input current of any one 1y of the rectifier stages 1a, 1b, 1c that is operated in the PWM mode at any time, then a duty cycle dy of the high-side switch THy of rectifier stage 1y or the low-side switch TLy of the rectifier stage 1y is given by $$dy = \frac{|Iy|}{Ip}. \tag{5}$$

As outlined above, the high-side switch THy is operated in the PWM mode when the input current Iy is positive, and the low-side switch TLy is operated in the PWM mode when the input current Iy is negative.

Referring to the above, operating a rectifier stage 1a, 1b, 1c in the PWM mode includes alternatingly switching on and off one of the high-side switch TH and the low-side switch TL of the respective rectifier stage 1a, 1b, 1c, while the other one of the high-side switch TH and the low-side switch TL is switched off. Thus, the current from the input nodes to the output p, n does not flow continuously. It should be noted that the current waveforms of the input currents Ia, Ib, Ic shown in FIG. 11 represent averages of the input currents Ia, Ib, Ic over one or more drive cycles.

In view of the inductors La, Lb, Lc in the optional input filter 101 a continuous flow of current received from the power source PS may be beneficial in order to avoid high voltages at the input nodes a, b, c during those time in which both switches TH, TL of a respective rectifier stage 1a, 1b, 1c are switched off and the respective input current Ia, Ib, Ic is interrupted. That is, it would be beneficial to have continuous current flows through the filter inductors La, Lb, Lc. In the filter 101 according to FIG. 6, during those time periods in the PWM mode in which both switches TH, TL of a respective rectifier stage 1a, 1b, 1c are switched off, the respective capacitor Ca, Cb, Cc takes over the respective inductor current. In the first section P1, for example, in which the first and third rectifier stages 1a, 1c are operated in the PWM mode, each capacitor Ca, Cc takes over the respective inductor current, that is, provides a freewheeling path, during those time periods in which the respective high-side switch THa, THc is switched off.

According to one example, in order to avoid high voltages at the output nodes p, n of rectifier 1 due to the at least one inductor in the inductor circuit 3, a timing of switching on and switching off the two switches that are operated in the PWM mode is such that at each time in one drive cycle at least one of the two switches is switched on. That is, the duration of the on-time of each of the two switches is given by a respective duty-cycle, and the time instance of switching on the each of the switches switch within one drive cycle is selected such that at each time one of the switches is in an on-state. In the first section P1, for example, this may be achieved by switching the high-side switches THa and THc of the first and third rectifier stages 1a, 1c such that one of the high-switches THa, THc is switched on such that its on-time starts at the beginning of the drive cycle and the other one of the high-switches THa, THc is switched on such that its on-time ends at the beginning of the drive cycle, wherein the on-times overlap in the middle of the drive cycle. Modulation schemes that ensure, in a current source rectifier, that from two PWM modulated high-side or low-side switches one of the switches is in a conducting state at each time of a drive cycle are commonly known, so that no further explanation is required in this regard.

Referring to the above, only one of the rectifier 1 and the inverter 2 is operated in the 2/3 mode at the same time and the other one of the rectifier 1 and the inverter 2 is operated in the 3/3 mode. Rectifier 1, for example, can be operated in the 2/3 mode when the output current Ip at least approximately equals the magnitude of the highest one of the input currents Ia, Ib, Ic. The inverter 2, for example, can be operated in the 2/3 mode when the input current Iq at least approximately equals the magnitude of the highest one of the output currents Iu, Iv, Iw. In each case, the one of the rectifier 1 and the inverter 2 that is operated in the 3/3 mode, shapes the DC current Ipq so that the other one of the rectifier 1 and the inverter 2 can be operated in the 2/3 mode. Thus, rectifier 1, when operated in the 3/3 mode, shapes the DC current Ipq and, therefore, the input current Iq of inverter 2 such that it equals the magnitude of the highest one of the output currents Iu, Iv, Iw, so that the inverter 2 can be operated in the 2/3 mode. The inverter 2, when operated in the 3/3 mode, shapes the DC current Ipq and, therefore, the output current Ip of the rectifier 1 such that it equals the magnitude of the highest one of the input currents Ia, Ib, Ic, so that the rectifier 1 can be operated in the 2/3 mode.

Figure 12:
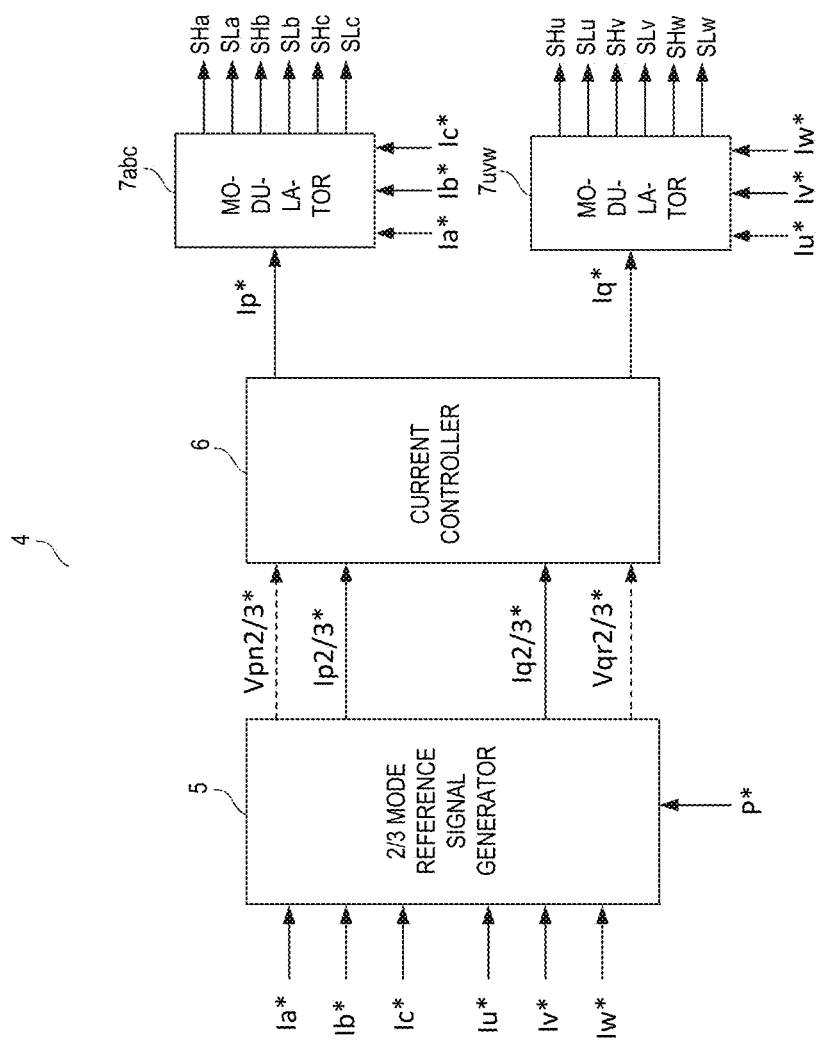
FIG. 12 illustrates one example of a controller configured to operate the current source converter dependent on input current references and output current references.

FIG. 12 illustrates one example of the controller 4 that is configured to provide the drive signals SHa, SLa, SHb, SLb, SHc, SLc for the high-side and low-side switches THa, TLa, THb, TLb, THc, TLc in the rectifier stages 1a, 1b, 1c and the drive signals. It should be noted that the block diagram according to FIG. 12 illustrates the functional blocks of the controller 4 rather than a specific implementation. Those functional blocks can be implemented in various ways. According to one example, these functional blocks are implemented using dedicated circuitry. According to another example, the controller 4 is implemented using hardware and software such as a microcontroller and software executed by microcontroller.

The controller 4 according to FIG. 12 is configured to generate the drive signals SH, SL based on input current references Ia*, Ib*, Ic* and output current references Iu*, Iv*, Iw*. The input current references Ia*, Ib*, Ic* represent desired (average) current levels of the input currents Ia, Ib, Ic, and the output current references Iu*, Iv*, Iw* represent desired (average) current levels of the output currents Iu, Iv, Iw. Examples for generating the input and output current references are explained herein further below.

Referring to FIG. 12, the controller 4 includes a first modulator 7abc and a second modulator 7uvw. The first modulator 7abc is configured to generate the drive signals SHa, SLa, SHb, SLb, SHc, SLc for the rectifier stages 1a, 1b, 1c based on a rectifier output current reference Ip* and the input current references Ia*, Ib*, Ic*, and the second modulator 7uvw is configured to generate the drive signals SHu, SLu, SHv, SLv, SHw, SLw for the high-side and low-side switches THu, TLu, THv, TLv, THw, TLw in the inverter stages 2u, 2v, 2w based on an inverter input current reference Iq* and the output current references Iu*, Iv*, Iw*.

According to one example, the first modulator 7abc is configured to generate the drive signals for a respective one of the rectifier stages 1a, 1b, 1c based on a ratio between the respective input current reference Ia*, Ib*, Ic* and the rectifier output current reference Ip*. More specifically, the first modulator 7abc may be configured to calculate a respective duty da, db, dc for each of the rectifiers 1a, 1b, 1c and provide the drive signals SHa, SLa, SHb, SLb, SHc, SLc based on the duty-cycles. According to one example, the duty-cycles are given by $$da = \frac{Ia^*}{|Ip^*|} \quad (6a)$$

$$db = \frac{Ib^*}{|Ip^*|} \quad (6b)$$

$$dc = \frac{Ic^*}{|Ip^*|}, \quad (6c)$$

and the first modulator 7abc is configured to generate the drive SHa, SLa, SHb, SLb, SHc, SLc for each rectifier 1a, 1b, 1c such that one of the high-side switches THa, THb, THc and the low side switches TLa, TLb, TLc in each of the rectifier stages 1a, 1b, 1c is operated in the PWM mode in accordance with the respective duty-cycle da, db, dc and the other one of the high-side switches THa, THb, THc and the low side switches TLa, TLb, TLc is switched off throughout the respective drive cycle. Whether the high-side switch THa, THb, THc or the low-side switch TLa, TLb, TLc of a rectifier stage 1a, 1b, 1c is operated in the PWM mode is dependent on the polarity of the respective input current reference Ia*, Ib*, Ic*. According to one example, the high-side switch THa, THb, THc is operated in the PWM mode when the respective input current reference Ia*, Ib*, Ic* is positive, and the low-side switch TLa, TLb, TLc is operated in the PWM mode when the respective input current reference Ia*, Ib*, Ic* is negative.

According to one example, the second modulator 7uvw is configured to generate the drive signals for a respective one of the inverter stages 2u, 2v, 2w based on a ratio between the respective output current reference Iu*, Iv*, Iw* and the inverter input current reference Iq*. More specifically, the second modulator 7uvw may be configured to calculate a respective duty du, dv, dw for each of the rectifiers 1u, 1v, 1w and provide the drive signals SHu, SLu, SHv, SLv, SHw, SLw based on the duty-cycles. According to one example, the duty-cycles are given by $$du = \frac{Iu^*}{|Iq^*|} \quad (6d)$$

$$db = \frac{Iv^*}{|Iq^*|} \quad (6e)$$

$$dc = \frac{Iw^*}{|Iq^*|}, \quad (6f)$$

and the second modulator 7uvw is configured to generate the drive SHu, SLu, SHv, SLv, SHw, SLw for each rectifier 2u, 2v, 2w such that one of the high-side switches THu, THv, THw and the low side switches TLu, TLv, TLw in each of the inverter stages 2u, 2v, 2w is operated in the PWM mode in accordance with the respective duty-cycle du, dv, dw and the other one of the high-side switches THu, THv, THw and the low side switches TLu, TLv, TLw is switched off throughout the respective drive cycle. Whether the high-side switch THu, THv, THw or the low-side switch TLu, TLv, TLw of an inverter stage 2u, 2v, 2w is operated in the PWM mode is dependent on the polarity of the respective output current reference Iu*, Iv*, Iw*. According to one example, the high-side switch THu, THv, THw is operated in the PWM mode when the respective output current reference Iu*, Iv*, Iw* is positive, and the low-side switch TLu, TLv, TLw is operated in the PWM mode when the respective output current reference Iu*, Iv*, Iw* is negative.

Referring to FIG. 12, the controller 4 further includes a 2/3 mode reference signal generator 5 and a current controller 6. The 2/3 mode reference signal generator 5 is configured to receive the input current references Ia*, Ib*, Ic* and the output current references Iu*, Iv*, Iw* and is configured to at least generate a 2/3 mode rectifier output current reference Ip2/3* and a 2/3 mode inverter input current reference Iq2/3*. The 2/3 mode rectifier output current reference Ip2/3* represents an (ideal) rectifier output current Ip that would allow to operate the rectifier in the 2/3 mode. The 2/3 mode inverter input current reference Iq2/3* represents an (ideal) inverter input current Iq that would allow to operate the inverter in the 2/3 mode.

According to one example, the 2/3 mode rectifier output current reference Ip2/3* is generated such that, at each time, it equals the magnitude of the highest one of the input current references Ia*, Ib*, Ic*, so that $$Ip2/3^*=\max\{|Ia^*|,|Ib^*|,|Ic^*|\} \quad (7a).$$

Equivalently, the 2/3 mode inverter input current reference Iq2/3* may be generated such that, at each time, it equals the magnitude of the highest one of the output current references Iu*, Iv*, Iw*, so that $$Iq2/3^*=\max\{|Iu^*|,|Iv^*|,|Iq^*|\} \quad (7)$$

The input current references Ia*, Ib*, Ic* and output current references Iu*, Iv*, Iw* are alternating signals such as sinusoidal signals, for example.

According to one example, the 2/3 mode reference signal generator 5 is further configured to output a 2/3 mode rectifier output voltage reference Vpn2/3* and 2/3 mode inverter input voltage reference Vqr2/3*. The 2/3 mode rectifier output voltage reference Vpn2/3* is associated with the 2/3 mode rectifier output current reference Ip2/3* and represents the (ideal) rectifier output voltage Vpn when the rectifier output current Ip is in accordance with the 2/3 mode rectifier output current reference Ip2/3*. The 2/3 mode inverter input voltage reference Vqr2/3* is associated with the 2/3 mode inverter input current reference Iq2/3* and represents the (ideal) inverter input voltage Vqr when the inverter input current Iq is in accordance with the 2/3 mode inverter input current reference Iq2/3*. According to one example, the 2/3 mode rectifier output voltage reference Vpn2/3* is inversely proportional to the 2/3 mode rectifier output current reference Ip2/3*, and the 2/3 mode inverter input voltage reference Vqr2/3* is inversely proportional to the 2/3 mode inverter input current reference Iq2/3* as follows, $$Vpn2/3^* = \frac{P^*}{Ip2/3^*} \quad (8a)$$

$$Vqr2/3^* = \frac{P^*}{Iq2/3^*}, \quad (8b)$$

where P* denotes an output reference, which represents a desired power to be provided by the current source converter to the load Z.

The current controller 6 is configured to generate the rectifier output current reference Ip* received by the first modulator 7abc and the inverter input current reference Iq* received by the second modulator 7uvw at least dependent on the 2/3 mode rectifier output current reference Ip2/3* and the 2/3 mode inverter input current reference Iq2/3*. Referring to the above, at each time, one of the rectifier 1 and the inverter 2 is operated in the 2/3 mode and the other one of the rectifier 1 and the inverter 2 is operated in the 3/3 mode, wherein the one of the rectifier 1 and the inverter 2 that is operated in the 3/3 mode shapes the DC current, that is, shapes the rectifier output current Ip and the inverter input current Iq.

According to one example, when the rectifier 1 is to be operated in the 2/3 mode, the current controller 6 generates the rectifier output current reference Ip* received by the first modulator 7abc such that it equals the 2/3 mode rectifier output current reference Ip2/3* that is, Ip*=Ip2/3*. The 2/3 mode rectifier output current reference Ip2/3* in combination with the input current references Ia*, Ib*, Ic* causes the first modulator 7abc to automatically operate the rectifier 1 in the 2/3 mode. More specifically, the 2/3 mode rectifier output current reference Ip2/3*, at each time, equals the magnitude of the highest one of the input current references Ia*, Ib*, Ic*, so that, at each time, one of the duty cycles da, db, dc equals 1 and the corresponding rectifier stage 1a, 1b, 1c is operated in the static mode. The inverter 2 operates in the 3/3 mode and shapes the DC current when the rectifier 1 is operated in the 2/3 mode. The inverter input current reference Iq* received by the second modulator 7uvw, in this case, is based on the 2/3 mode rectifier output current reference Ip2/3* but not necessarily equals the 2/3 mode rectifier output current reference Ip2/3*. That is, the inverter input current reference Iq* that is used to shape the DC current Ipq may (slightly) deviate from the 2/3 mode rectifier output current reference Ip2/3*. The deviation may result from a regulation loop included in the current controller 6 that is configured to adjust the inverter input current reference Iq* such that the instantaneous DC current Ipq tracks the 2/3 mode rectifier output current reference Ip2/3*. When the rectifier 1 is to be operated in the 2/3 mode, the inverter input current reference Iq* received by the second modulator 7uvw is different from the 2/3 mode inverter input current reference Iq2/3*. Thus, the inverter 2 operates in the 3/3 mode when the rectifier operates in the 2/3 mode.

When the inverter 1 is to be operated in the 2/3 mode, the current controller 6 generates the inverter input current reference Ip* received by the second modulator 7uvw such that it equals the 2/3 mode inverter input current reference Iq2/3* that is, Iq*=Iq2/3*. The 2/3 mode inverter input current reference Iq2/3* in combination with the output current references Iu*, Iv*, Iw* causes the second modulator 7uvw to automatically operate the inverter 2 in the 2/3 mode. More specifically, the 2/3 mode inverter input current reference Iq2/3*, at each time, equals the magnitude of the highest one of the output current references Iu*, Iv*, Iw*, so that, at each time, one of the duty cycles du, dv, dw equals 1 and the corresponding inverter stage 2u, 2v, 2w is operated in the static mode. The rectifier 1 operates in the 3/3 mode and shapes the DC current when the rectifier 1 is operated in the 2/3 mode. The rectifier output current reference Ip* received by the first modulator 7abc, in this case, is based on the 2/3 mode inverter input current reference Iq2/3* but not necessarily equals the 2/3 mode inverter input current reference Iq2/3*. That is, the rectifier output current reference Ip* that is used to shape the DC current Ipq may (slightly) deviate from the 2/3 mode inverter input current reference Iq2/3*. The deviation may result from a regulation loop included in the current controller 6 that is configured to adjust the rectifier output current reference Ip* such that the instantaneous DC current Ipq tracks the 2/3 mode inverter input current reference Iq2/3*. When the inverter 2 is to be operated in the 2/3 mode, the rectifier output reference Ip* received by the first modulator 7abc is different from the 2/3 mode rectifier output current reference Ip2/3*. Thus, the rectifier 1 operates in the 3/3 mode when the inverter operates in the 2/3 mode.

Referring to the above, whether the rectifier 1 or the inverter 2 is operated in the 2/3 mode is dependent on the operating state. According to one example, the operating state is dependent on the input and output current references Ia*, Ib*, Ic*, Iu*, Iv*, Iw*, so that dependent on these input and output current references Ia*, Ib*, Ic*, Iu*, Iv*, Iw* the rectifier 1 or the inverter 2 is operated in the 2/3 mode. According to one example, the operating state is dependent on the 2/3 mode rectifier output current reference Ip2/3* and the 2/3 mode inverter input current reference Iq2/3*, and the controller 4 is configured to operate the one of the rectifier 1 and the inverter 2 in the 2/3 mode that has the higher 2/3 mode current reference. That is, when the 2/3 mode rectifier output current reference Ip2/3* is higher than the 2/3 mode inverter input current reference Iq2/3* the rectifier 1 is operated in the 2/3 mode, and vice versa.

Figure 13:
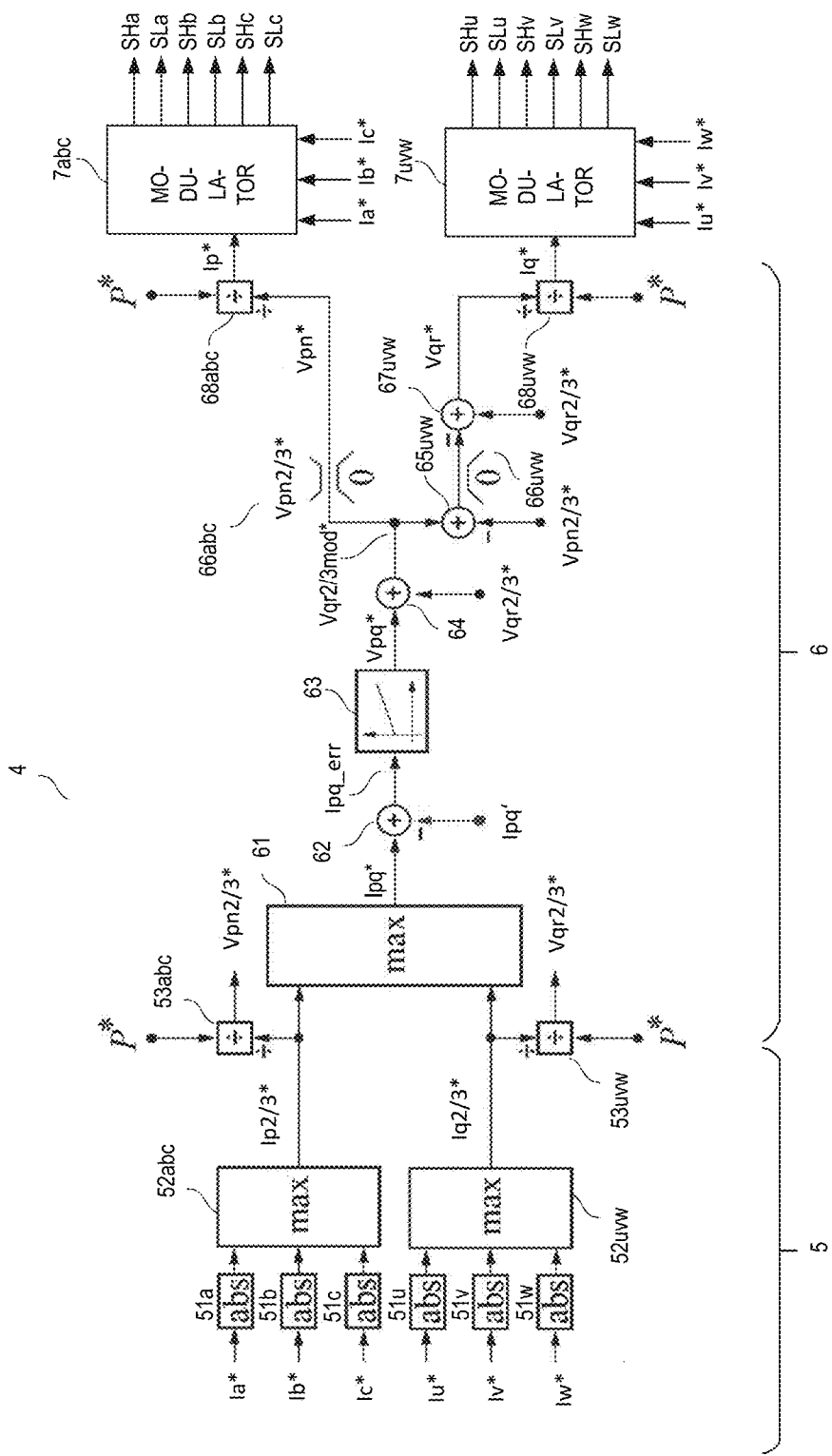
FIG. 13 illustrates one example of the controller in greater detail.

FIG. 13 illustrates one example of the controller 4 according to FIG. 12 in greater detail. Referring to FIG. 13, the 2/3 mode reference signal generator 5 includes magnitude calculators 51a, 51b, 51c that are configured to obtain the magnitudes (absolute values) of the input current references Ia*, Ib*, Ic*. A maximum calculator 52abc receives these magnitudes and is configured to output the highest one of these magnitudes as the 2/3 mode output current reference Ip2/3* by. Equivalently, calculating the 2/3 mode input current reference Iq2/3* includes calculating the magnitudes (absolute values) of the output current references Iu*, Iv*, Iw* by respective magnitude calculators 68u, 68v, 68w and outputting the highest one of these magnitudes as the 2/3 mode input current reference Iq2/3* by a maximum calculator 52*uvw*.

Furthermore, the 2/3 mode reference signal generator 5 includes a first divider 53*abc* configured to calculate the 2/3 mode rectifier output voltage reference Vpn2/3* based on the output power reference P* and the 2/3 mode rectifier output current reference Ip2/3*, and a second divider 53*uvw* configured to calculate the 2/3 inverter input voltage reference Vqr2/3* based on the output power reference P* and the 2/3 mode inverter input current reference Ip2/3*.

Referring to FIG. 13, the current controller 6 includes a maximum calculator 61 that receives the 2/3 mode rectifier output current reference Ip2/3* and the 2/3 mode inverter input current reference Iq2/3* and outputs the higher one of these references Ip2/3*, Iq2/3* as a DC current reference Ipq*, which represents the desired current from the rectifier 1 to the inverter 2. A subtractor 62 subtracts a measured DC current Ipq' from the DC current reference Ipq* to output an error signal Ipq_err. The measured DC current Ipq' represents the DC current Ipq and may be obtained by measuring the DC current Ipq using any kind of conventional current measurement circuit (not shown). The error signal Ipq_err represents a deviation of the instantaneous DC current, as represented by the measured DC current Ipq', and the desired DC current, as represented by the DC current reference Ipq*.

The error signal Ipq_err is received by a regulator 63 that outputs an inductor voltage reference Vpq*, which is the reference of the voltage Vpq across the inductor circuit 3. Regulator 63 may have any one of a proportional (P), proportional-integrative (PI), proportional-integrative-derivative (PID) characteristic.

Referring to FIG. 13, an adder 64 adds the inductor voltage reference Vpq* and the 2/3 mode inverter input voltage reference Vqr2/3* to provide a modified 2/3 mode inverter input voltage reference Vqr2/3 mod* (Vqr2/3 mod*=Vqr2/3*+Vpq*).

In the current controller 6 according to FIG. 6, a decision whether the rectifier 1 or the inverter 2 is operated in the 2/3 mode is based on a relationship between the modified 2/3 mode inverter input voltage reference Vqr2/3 mod*, which takes into account the 2/3 mode inverter input voltage reference Vqr2/3* and the inductor voltage reference Vpq*, and the 2/3 mode rectifier output voltage reference Vpn2/3*. This is explained in the following.

(1) When the modified 2/3 mode inverter input voltage reference Vqr2/3 mod* is higher than the 2/3 mode rectifier output voltage reference Vpn2/3*, the rectifier 1 is operated in the 2/3 mode. In this case, a limiter 66*abc*, which receives the modified 2/3 mode inverter input voltage reference Vqr2/3 mod*, outputs the 2/3 mode rectifier output voltage reference Vpn2/3* as a rectifier output voltage reference Vpn* and a divider 68*uvw*, which receives the rectifier output voltage reference Vpn* and the output power reference P* outputs the 2/3 mode rectifier output current reference Ip2/3* as the rectifier output current reference Ip*, so that the rectifier 1 operates in the 2/3 mode.

Furthermore, when the modified 2/3 mode inverter input voltage reference Vqr2/3 mod* is higher than the 2/3 mode rectifier output voltage reference Vpn2/3* the inverter 2 is operated in the 3/3 mode, wherein the inverter input current reference Iq* deviates from the 2/3 mode rectifier output current reference Ip2/3* and is given by $$Iq^* = \frac{P^*}{Vqr*} = \frac{P^*}{Vpn2/3^* - Vpq*}. \tag{9}$$

The inverter input current reference Iq* is provided by a divider 68*abc* that receives the output power reference P* and an inverter input voltage reference Vqr*. Through a series connection of two subtractors 65*uvw*, 76*uvw* and a limiter 66*uvw* connected between the subtractors 65*uvw*, 76*uvw*, the inverter input voltage reference Vqr* is obtained as the difference between the 2/3 mode rectifier output voltage reference Vpn2/3* and the inductor voltage reference Vpq* (Vqr*=Vpn2/3*−Vpq*). The limiter 66*uvw*, which is configured to limit negative values to zero, has no effect when the modified 2/3 mode inverter input voltage reference Vqr2/3 mod* is higher than the 2/3 mode rectifier output voltage reference Vpn2/3*. This is because an output signal of the first subtractor 65*uvw* that is received by the limiter 66*uvw* is greater than zero. The first subtractor 66*uvw* subtracts the 2/3 mode rectifier output voltage reference Vpn2/3* from the modified 2/3 mode inverter input voltage reference Vqr2/3 mod*. The second subtractor 67*abc* subtracts the (non-limited) output signal of the first subtractor 65*uvw* from 2/3 mode inverter input voltage reference Vqr2/3* to provide the inverter input voltage reference Vqr*.

(2) When the modified 2/3 mode inverter input voltage reference Vqr2/3 mod* is lower than the 2/3 mode rectifier output voltage reference Vpn2/3*, the inverter 2 is operated in the 2/3 mode. In this case, the output signal of the first subtractor 65*uvw* is negative, so that the output signal of the limiter 66*uvw* is zero and the inverter input voltage reference Vqr* output by the second subtractor 67*abc* equals the 2/3 mode inverter input voltage reference Vqr2/3*. Thus, the inverter input current reference Iq* equals the 2/3 mode inverter input current reference Iq2/3* and the inverter 2 is operated in the 2/3 mode.

Furthermore, when the modified 2/3 mode inverter input voltage reference Vqr2/3 mod* is lower than the 2/3 mode rectifier output voltage reference Vpn2/3* limiter 66*abc* outputs the modified 2/3 mode inverter input voltage reference Vqr2/3 mod* as the rectifier output voltage reference Vpn*, so that the rectifier output current reference Ip* is given by $$Ip^* = \frac{P^*}{Vqr2/3\text{mod}^*} = \frac{P^*}{Vqr2/3^* + Vpq*}. \tag{10}$$

As can be seen from equations (9) and (10), the current reference of the one of the rectifier 1 and the inverter 2 that operates in the 3/3 mode may deviate from the 2/3 mode current reference (Ip2/3* or Iq2/3*) of the one of the rectifier 1 and the inverter 2 that operates in the 2/3 mode. Such deviation results from the control loop that is included in the current controller and generates the inductor voltage reference Vpq* in order to regulate the DC current Ipq.

Referring to the above, the rectifier 1 is operated in the 2/3 mode, when the modified 2/3 mode input voltage reference Vqr2/3 mod* is higher than the 2/3 mode output voltage reference Vpn2/3*, that is, $$Vqr2/3\text{ mod}^* > Vpn2/3' \tag{11a}$$

Furthermore, the inverter 2 is operated in the 2/3 mode, when the 2/3 mode output voltage reference Vpn2/3* is higher than the modified 2/3 mode input voltage reference Vqr2/3 mod*, that is, $$Vpn2/3' > Vqr2/3\text{ mod}^* \tag{1b}$$

The modified 2/3 mode input voltage reference Vqr2/3 mod* has a corresponding modified 2/3 mode input current reference Iq2/3 mod*, which is given by $$Iq2/3\text{mod}^* = \frac{P^*}{Vqr2/3\text{mod}^*}. \tag{12}$$

Based on equations (8a), (11a) and (12) ist can be seen that the rectifier 1 operates in the 2/3 mode, when the 2/3 mode output current reference Ip2/3* is higher than the modified 2/3 mode input current reference Iq2/3 mod*, that is, $$Ip2/3^* > Iq2/3 \text{ mod}^* \tag{13a}.$$

Based on equations (8b), (11b) and (12) it can be seen that the inverter 2 operates in the 2/3 mode, when the modified 2/3 mode input current reference Iq2/3 mod* is higher than the 2/3 mode output current reference Ip2/3*, that is, $$Iq2/3 \text{ mod}^* > Ip2/3 \tag{13b}.$$

Referring to the above, the modified 2/3 mode input voltage reference Vqr2/3 mod* and, therefore, the modified 2/3 mode input current reference Iq2/3 mod*, in addition to the output current references Iu*, Iv*, Iw* considers the inductor voltage reference Vpq* provided by the control loop.

In the steady state, the inductor voltage reference Vpq is much smaller than the 2/3 mode inverter input voltage reference Vqr2/3*, so that the modified 2/3 mode inverter input voltage reference Vqr2/3 mod* approximately equals the 2/3 mode inverter input voltage reference Vqr2/3* and the modified 2/3 mode input current reference Iq2/3 mod* approximately equals the 2/3 mode input current reference Iq2/3*, $$Vqr2/3 \text{ mod}^* \approx Vqr2/3' \tag{14a}$$

$$Iq2/3 \text{ mod}^* \approx Iq2/3 \tag{14b}.$$

During load transients, however, the inductor voltage reference Vpq* may reach a level that is not negligible, wherein the inductor voltage reference Vpq* may even become negative.

Thus, most of the time equation (14b) applies so that the current source converter operates in the first operating mode rectifier 1 when the 2/3 mode output current reference Ip2/3* is higher than the 2/3 mode input current reference Iq2/3* and the second operating mode when the 2/3 mode input current reference Iq2/3* is higher than the 2/3 mode output current reference Ip2/3*. That is, the rectifier 1 operates in the 2/3 mode when 2/3 mode output current reference Ip2/3* is higher than the 2/3 mode input current reference Iq2/3*, and the inverter 2 operates in the 2/3 mode when the 2/3 mode input current reference Iq2/3* is higher than the 2/3 mode output current reference Ip2/3*. In each case, however, controller 4 operates one of the rectifier 1 and the inverter 2 in the 2/3 mode and the other one in the 3/3 mode. Furthermore, there is a seamless transition between operating one of the rectifier 1 and the inverter 2 in the 2/3 mode and operating the other one of the rectifier 1 and the inverter 2 in the 2/3 mode.

It should be noted that calculating the modified 2/3 mode input voltage reference Vqr2/3 mod* (the modified 2/3 mode input current reference Iq2/3 mod*) based on the 2/3 mode input voltage reference Vqr2/3* (the 2/3 mode input current reference Iq2/3*) and the inductor voltage reference Vpq* and operating the current source converter in the first or second operating mode dependent on a relationship between the modified 2/3 mode input voltage reference Vqr2/3 mod* and the 2/3 mode output voltage reference Vpn2/3* (a relationship between the modified 2/3 mode input current reference Iq2/3 mod* and the 2/3 mode output current reference Ip2/3*) is only an example. It is also possible to calculate a modified 2/3 mode output voltage reference Vpn2/3 mod* (a modified 2/3 mode output current reference Ip2/3*) based on the 2/3 mode output voltage reference Vpn2/3* (the 2/3 mode output current reference Ip2/3*) and the inductor voltage reference Vpq* and to operate the current source converter in the first or second operating mode dependent on a relationship between the modified 2/3 mode output voltage reference Vpn2/3 mod* (the modified 2/3 mode output current reference Ip2/3*) and the 2/3 mode input voltage reference Vqr2/3* (the modified 2/3 mode output current reference Ip2/3*).

According to one example, the modified 2/3 mode output voltage reference Vpn2/3 mod* is given by the 2/3 mode output voltage reference Vpn2/3* minus the inductor voltage reference Vpq*, $$Vpn2/3 \text{ mod}^* = Vpn2/3 - Vpq^* \tag{15}.$$

In this example, the current source converter operates in the first operating mode, so that the rectifier 1 operates in the 2/3 mode and the inverter operates in the 3/3 mode, when the modified 2/3 mode output voltage reference Vpn2/3 mod* is lower than the 2/3 mode input voltage reference Vqr2/3*, $$Vpn2/3 \text{ mod}^* < Vqr2/3^* \tag{16a},$$

and the current source converter operates in the second operating mode, so that the inverter 2 operates in the 2/3 mode and the rectifier 1 operates in the 3/3 mode, when the modified 2/3 mode output voltage reference Vpn2/3 mod* is higher than the 2/3 mode input voltage reference Vqr2/3*, $$Vpn2/3 \text{ mod}^* > Vqr2/3^* \tag{16b}.$$

According to one example, the modified 2/3 mode output current reference Ip2/3 mod* is given by the output power reference P* divided by the modified 2/3 mode output voltage reference Vpn2/3 mod*, $$Ip2/3\text{mod}^* = \frac{P^*}{Vpn2/3\text{mod}^*}. \tag{17}$$

In this example, the current source converter operates in the first operating mode, so that the rectifier 1 operates in the 2/3 mode and the inverter operates in the 3/3 mode, when the modified 2/3 mode output current reference Ip2/3 mod* is higher than the 2/3 mode input current reference Iq2/3*, $$Ip2/3 \text{ mod}^* > Iq2/3^* \tag{18a},$$

and the current source converter operates in the second operating mode, so that the inverter 2 operates in the 2/3 mode and the rectifier 1 operates in the 3/3 mode, when the modified 2/3 mode output current reference Ip2/3 mod* is lower than the 2/3 mode input current reference Iq2/3*, $$Ip2/3 \text{ mod}^* < Iq2/3^* \tag{18b}.$$

Summarizing the above, the operating state of the current source converter may be defined by a relationship between a 2/3 mode reference associated with the rectifier 1 and a 2/3 mode reference associated with the inverter 2, so that the current source converter dependent on this relationship either operates in the first operating mode or the second operating mode. The 2/3 mode reference associated with the rectifier 1 is the 2/3 mode output current reference Ip2/3* or the 2/3 mode output voltage reference Vpn2/3*, for example. The 2/3 mode reference associated with the inverter 2 is the 2/3 mode input current reference Iq2/3* or the 2/3 mode input voltage reference Vqr2/3*, for example.

According to another example, the operating state of the current source converter may be defined by a relationship between a modified 2/3 mode reference associated with one of the rectifier 1 and the inverter 2 and a 2/3 mode reference associated with the other one of the rectifier 1 and the inverter 2. The modified 2/3 mode reference associated with the rectifier 1 is the modified 2/3 mode output current reference Ip2/3 mod*, or the modified 2/3 mode output voltage reference Vpn2/3 mod*, for example. The modified 2/3 mode reference associated with the inverter 2 is the modified 2/3 mode input current reference Iq2/3 mod*, or the modified 2/3 mode input voltage reference Vqr2/3 mod*, for example. The 2/3 mode reference associated with the rectifier 1 is the 2/3 mode output current reference Ip2/3* or the 2/3 mode output voltage reference Vpn2/3*, for example. The 2/3 mode reference associated with the inverter 2 is the 2/3 mode input current reference Iq2/3* or the 2/3 mode input voltage reference Vqr2/3*, for example. In each case, the modified 2/3 mode reference is dependent on a respective 2/3 mode reference and an inductor voltage reference Vpq*, wherein the inductor voltage reference Vpq* represents a desired voltage across the inductor circuit and is provided by a regulation loop (which includes subtractor 62 and filter 63 in the example shown in FIG. 13).

Referring the above, the controller 4 according to FIG. 13 is configured to generate drive signals SH, SL for the high-side and low-side switches in the rectifier 1 and the inverter 2 based on input current references Ia*, Ib*, Ic* and output current references Iu*, Iv*, Iw*. These current references may be generated in various ways.

Figure 14:
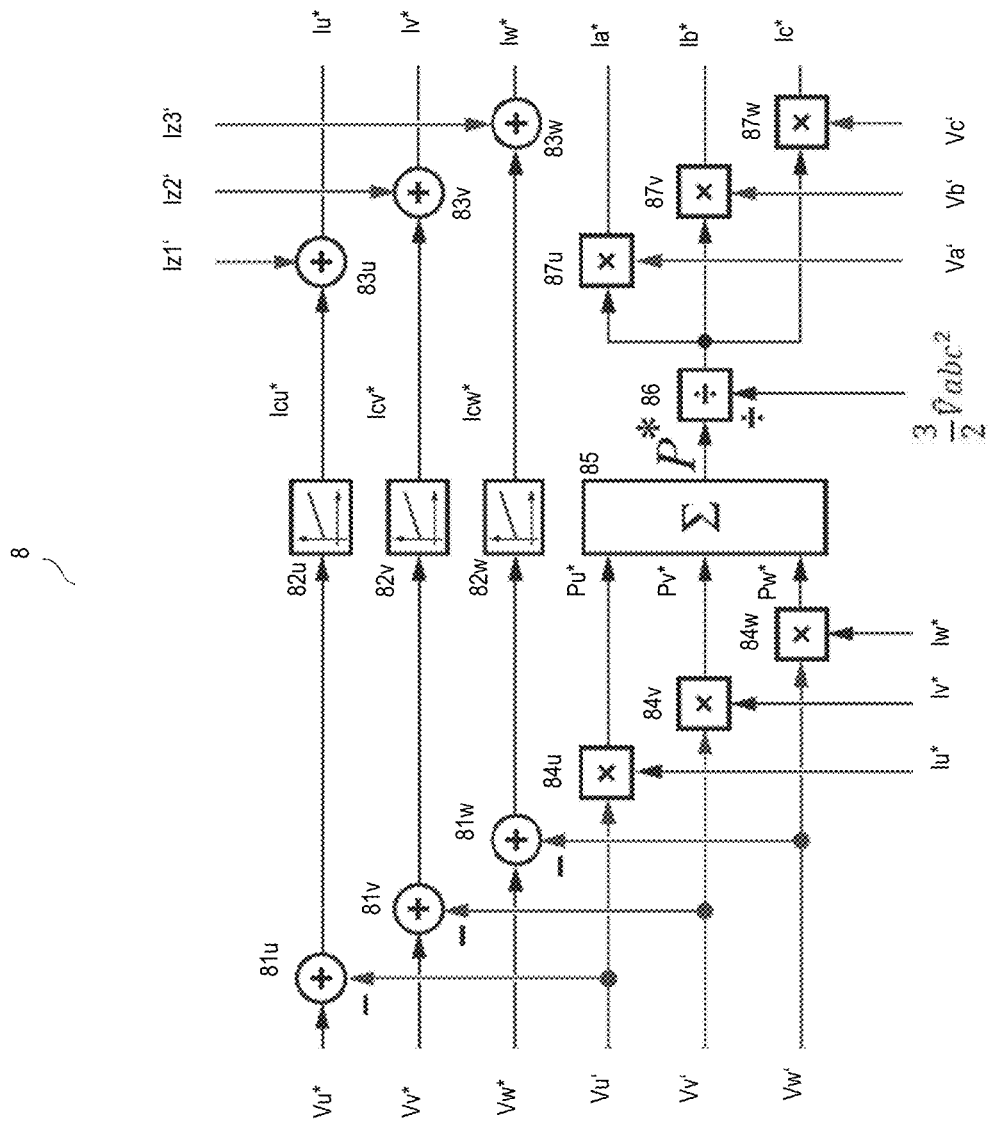
FIG. 14 illustrates one example of an output voltage control circuit configured to generate input current references and output current references.

FIG. 14 illustrates one example of a controller 8 that is configured to generate these input and output current references Ia*, Ib*, Ic*, Iu*, Iv*, Iw* based on output voltage references Vu*, Vv*, Vw* and measured output voltages Vu', Vv', Vw'. These output voltage references represent desired voltage levels of output voltages Vu, Vv, Vw. These output voltages Vu, Vv, Vw are either voltages between the output nodes u, v, w and the common node N21 of the load Z or voltages between the output nodes u, v, w and the common node N22 of the output filter 102. The output voltage references Vu*, Vv*, Vw* define a desired operating mode of the motor Z and may be provided by a motor controller, for example.

Calculating the output current references Iu*, Iv*, Iw* in the example illustrated in FIG. 14 includes calculating error voltages by calculating a difference between each of the output voltage references Vu*, Vv*, Vw* and a respective measured output voltage Vu', Vv', Vw' by a respective subtractor 81u, 81v, 81w. The measured output voltages Vu', Vv', Vw' represent instantaneous voltage levels of the output voltages Vu, Vv, Vw and can obtained by measuring the output voltages Vu, Vv, Vw using any kind of conventional voltage measurement circuit (not shown). An error signal output by subtractor 81u represents a difference between a first output voltage reference Vu* and a respective measured first output voltage Vu', an error signal output by subtractor 81v represents a difference between a second output voltage reference Vv' and a measured second output voltage Vv', and an error signal output by subtractor 81w represents a difference between output voltage reference Vw* and a respective measured third output voltage Vw'.

Each of the error signals is received by a respective controller 82u, 82v, 82w, wherein each controller 82u, 82v, 82w outputs a respective current reference Icu*, Icv*, Icw*. Each of these current references Icu*, Icv*, Icw* represents a desired current into a respective one of the filter capacitors Cu, Cv, Cw. Each of these current references Icu*, Icv*, Icw* is added to a respective measured load current Iz1', Iz2', Iz3' by a respective adder 83u, 83v, 83w in order to output the output current references Iu*, Iv*, Iw*. The measured load currents Iz1*', Iz2', Iz3' represent instantaneous current levels of the load currents Iz1', Iz2', Iz3'.

Referring to FIG. 13, calculating the input current references Ia*, Ib*, Ic* includes multiplying the measured output voltages Vu', Vv', Vw' with the output current references Iu*, Iv*, Iw* by the multipliers 84u, 84v, 84w. The output current references Iu*, Iv*, Iw* received by multipliers 84u, 84v, 84w may be a time delayed version of output current references Iu*, Iv*, Iw* provided by adders 83u, 84v, 83w. The controller 8 may be configured to output a new signal value of the input and output current references Iu*, Iv*, Iw*, Ia*, Ib*, Ic* for each drive cycle, for each sequence of several drive cycles, or even two times or more often within one drive cycle. The delay time may correspond to the duration of one drive cycle or of several drive cycles. Such delay time is significantly shorter than a period of the input and output current references Iu*, Iv*, Iw*, Ia*, Ib*, Ic* and is negligible.

Output signals of the multipliers 74u, 74v, 74w represent output power references Pu*, Pv*, Pw*, where each of these output power references Pu*, Pv*, Pw* represents the desired output power at one of the outputs u, v, w. An adder 85 adds the individual output power references Pu*, Pv*, Pw* in order to obtain the (overall) output power reference P* already explained above.

Referring to FIG. 13, a divider 86 divides the overall output power reference by $$\frac{3}{2}\hat{V}_{abc}^2,$$

where $\hat{V}_{abc}$ denotes the amplitudes of the input voltages Va, Vb, Vc received at the inputs a, b, c. An output signal of the divider 76 represents a conductance G of the rectifier 1. The input current references Ia*, Ib*, Ic* are obtained by multiplying the inductance G with measured input voltages Va', Vb', Vc', wherein the measured input voltages Va', Vb', Vc' represent instantaneous voltage levels of the input voltages Va, Vb, Vc and are obtained by measuring the input voltages Va, Vb, Vc. By multiplying the inductance G with the measured input voltages Va', Vb', Vc' input current references Ia*, Ib*, Ic* are obtained that are in phase with the input voltages Va, Vb. Vc. This, however, is only an example. A phase shift between the input voltages Va', Vb', Vc' and the input current references Ia*, Ib*, Ic* can be obtained by multiplying the conductance G with phase shifted versions of the measured input voltages Va', Vb', Vc'.

In the context of the controller 8 according to FIG. 14, input voltages Va, Vb, Vc are either the supply voltages provided by the power source PS or voltages between the input node a, b, c and the common circuit node N12 of the input filter 101, wherein the voltages between the input nodes a, b, c and the common circuit node N12 approximately equal the supply voltages. Accordingly, measured input voltages Va', Vb', Vc' are either obtained by measuring the supply voltages (when the input voltages Va, Vb, Vc are the supply voltages) or by measuring the voltages between the input nodes a, b, c and the common circuit node N12

(when the input voltages Va, Vb, Vc are the voltages between the input nodes a, b, c and the common circuit node N12).

Figure 15:
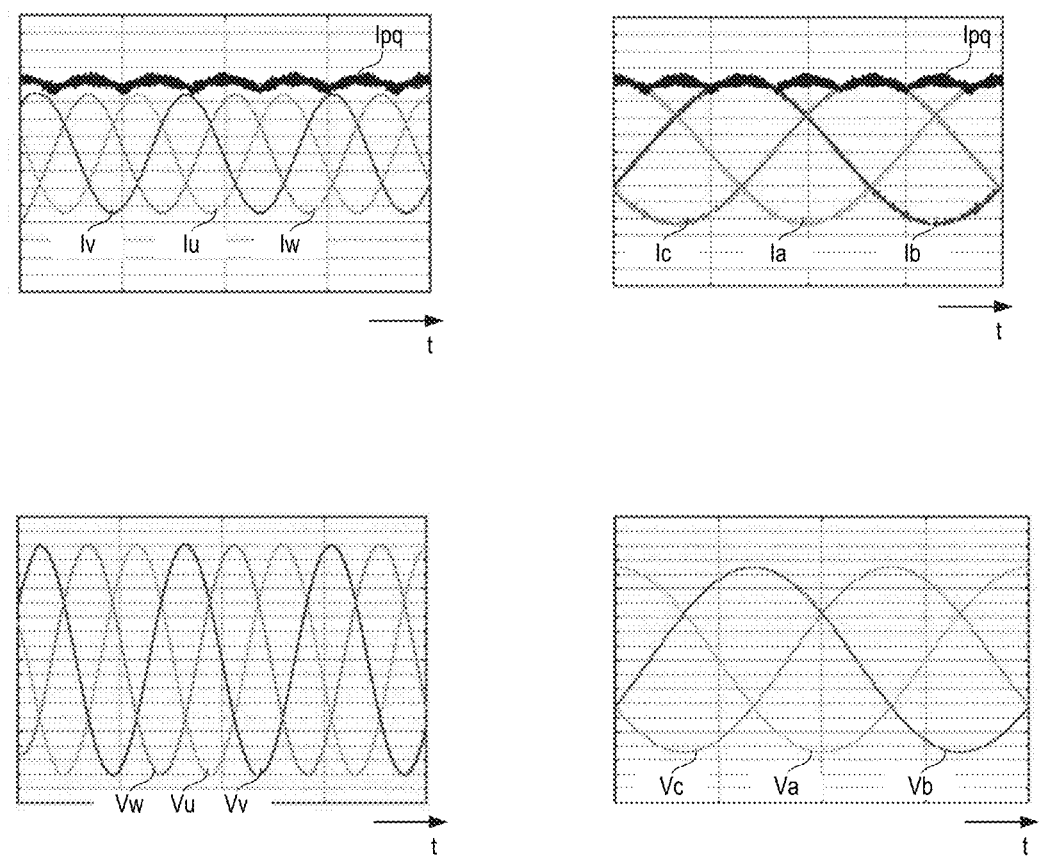
FIG. 15 shows signal diagrams that illustrate operating the current source rectifier in the 2/3 mode and the current source inverter in a 3/3 mode.

FIGS. 15-17 show signal diagrams that illustrate operating the current source converter in three different operating scenarios, wherein each of FIGS. 15-17 illustrates the input and output currents Ia, Ib, Ic, Iu, Iv, Iw, the DC current Ipq, and the input and output voltages Va, Vb, Vc, Vu, Vv, Vw within a given time period of the same length. The scale of the input voltages Va, Vb, Vc and the output voltages Vu, Vv, Vw is the same in each of FIGS. 15-17.

In the example shown in FIG. 15 the rectifier 1 is operated in the 2/3 mode and the inverter 2 is operated in the 3/3 mode and shapes the DC current Ipq. Thus, the DC current shaped by the inverter 3 at each time equals the magnitude of the highest input current Ia, Ib, Ic. The DC current Ipq is higher than each of the output currents Iu, Iv, Iw at each time in the scenario illustrated in FIG. 15. Furthermore, the frequency of the output currents Iu, Iv, Iw and the output voltages Vu, Vv, Vw is higher than the frequencies of the input currents Ia, Ib, Ic and the input voltages Va, Vb, Vc, and amplitudes of the output voltages Vu, Vv, Vw are higher than amplitudes of the input voltages Va, Vb, Vc.

In the example shown in FIG. 16 the inverter is operated in the 2/3 mode and the rectifier 1 is operated in the 3/3 mode and shapes the DC current Ipq. Thus, the DC current shaped by the rectifier 1 at each time equals the magnitude of the highest output current Iu, Iv, Iw. The DC current Ipq is higher than each of the output currents Ia, Ib, Ic at each time in the scenario illustrated in FIG. 16. Furthermore, the frequency of the output currents Iu, Iv, Iw and the output voltages Vu, Vv, Vw is higher than the frequencies of the input currents Ia, Ib, Ic and the input voltages Va, Vb, Vc, and amplitudes of the output voltages Vu, Vv, Vw are lower than amplitudes of the input voltages Va, Vb, Vc.

FIG. 17 illustrates an operating scenario in which amplitudes of the input and output currents Ia, Ib, Ic, Iu, Iv, Iw are essentially equal and amplitudes of the input and output voltages Va, Vb, Vc, Vu, Vv, Vw are essentially equal. This has the effect, that the rectifier 1 and the inverter 2, alternatingly operate in the 2/3 mode, dependent on which of the 2/3 mode current references $Ip2/3^*$, $Iq2/3^*$ is instantaneously higher. Nevertheless, there are time periods that are longer than the drive cycles in the PWM mode in which a rectifier stage 1a, 1b, 1c of the rectifier 1 or an inverter stage 2u, 2v, 2w of the inverter 2 is operated in the static mode. Thus, even in the operating scenario according to FIG. 17 switching losses are lower than in a scenario in which both the rectifier 1 and the inverter 2 are operated in the 3/3 mode.

It should be noted that the method and the controller explained above is capable of operating one of the rectifier 1 and the inverter 2 in the 2/3 mode independent of frequencies, amplitudes and phases of the input and output current references. Furthermore, the input and output current references may be obtained in various ways, so that obtaining the input and output current references is not restricted to the method explained with references to FIG. 14. In each case, switching losses can be reduced by operating one of the rectifier 1 and the inverter 2 in the 2/3 mode.

Some of the aspects explained above are summarized in the following by way of numbered examples.

Example 1. A method comprising: detecting an operating state of a current source converter that comprises a current source rectifier, a current source inverter, and an inductor circuit connected between an output of the current source rectifier and an input of the current source inverter, and dependent on the detected operating state, operating the current source converter in a first operating mode or a second operating mode, wherein operating the current source converter in the first operating mode comprises operating the current source rectifier in a 2/3 mode and operating the current source inverter in a 3/3 mode, and wherein operating the current source converter in the second operating mode comprises operating the current source inverter in the 2/3 mode and operating the current source rectifier in the 3/3 mode.

Example 2. The method according to example 1, wherein detecting the operating state comprises obtaining a 2/3 mode reference associated with the current source rectifier based on current references associated with the current source rectifier and obtaining a 2/3 mode reference associated with the current source inverter based on current references associated with the current source inverter, and wherein the operating state is dependent on a relationship between the 2/3 mode reference associated with the current source rectifier and the 2/3 mode reference associated with the current source inverter.

Example 3. The method of example 2, wherein the 2/3 mode reference associated with the current source rectifier is a 2/3 mode output current reference, wherein the 2/3 mode reference associated with the current source inverter is a 2/3 mode input current reference, and wherein the current source converter is operated in the first operating mode when the 2/3 mode output current reference is higher than the 2/3 mode input current reference and the second operating mode when the 2/3 mode output current reference is lower than the 2/3 mode input current reference.

Example 4. The method of example 3, wherein the 2/3 mode output current reference of the current source rectifier, at each time, equals the magnitude of the one of the current references associated with the current source rectifier that has the highest magnitude, and wherein the 2/3 mode input current reference of the current source inverter, at each time, equals the magnitude of the one of the current references associated with the current source inverter that has the highest magnitude.

Example 5. The method of example 2, wherein the 2/3 mode reference associated with the current source rectifier is a 2/3 mode output voltage reference, wherein the 2/3 mode reference associated with the current source inverter is a 2/3 mode input voltage reference, and wherein the current source converter is operated in the first operating mode when the 2/3 mode output voltage reference is lower than the 2/3 mode input voltage reference and the second operating mode when the 2/3 mode output voltage reference is higher than the 2/3 mode input voltage reference.

Example 6. The method according to example 1, wherein detecting the operating state comprises: obtaining a modified 2/3 mode reference associated with one of the current source rectifier and the current source inverter based on current references associated with the one of the current source rectifier and the current source inverter and an inductor voltage reference; and obtaining a 2/3 mode reference associated with the other one of the current source rectifier and the current source inverter, and wherein the operating state is dependent on a relationship between the modified 2/3 mode reference and the 2/3 mode reference.

Example 7. The method of example 6, wherein the modified 2/3 mode reference associated with the current source inverter is a modified 2/3 mode input current reference and the 2/3 mode reference associated with the current source rectifier is a 2/3 mode output current reference, and wherein the current source converter is operated in the first operating mode when the 2/3 mode output current reference is higher than the modified 2/3 mode input current reference and the second operating mode when the 2/3 mode output current reference is lower than the modified 2/3 mode input current reference.

Example 8. The method of example 6, wherein the modified 2/3 mode reference associated with the current source inverter is a modified 2/3 mode input voltage reference and the 2/3 mode reference associated with the current source rectifier is a 2/3 mode output voltage reference, and wherein the current source converter is operated in the first operating mode when the 2/3 mode output voltage reference is lower than the modified 2/3 mode input voltage reference, and the second operating mode when the 2/3 mode output voltage reference is higher than the modified 2/3 mode input voltage reference.

Example 9. The method of example 8, wherein the modified 2/3 mode input voltage reference is given by a 2/3 mode input voltage reference associated with the current source inverter plus the inductor voltage reference.

Example 10. The method of example 6, wherein the modified 2/3 mode reference associated with the current source rectifier is a modified 2/3 mode output current reference and the 2/3 mode reference associated with the current source inverter is a 2/3 mode input current reference, and wherein the current source converter is operated in the first operating mode when the modified 2/3 mode output current reference is higher than the 2/3 mode input current reference and the second operating mode when the modified 2/3 mode output current reference is lower than the 2/3 mode input current reference.

Example 11. The method of example 6, wherein the modified 2/3 mode reference associated with the current source rectifier is a modified 2/3 mode output voltage reference and the 2/3 mode reference associated with the current source inverter is a 2/3 mode input voltage reference, and wherein the current source converter is operated in the first operating mode when the modified 2/3 mode output voltage reference is lower than the 2/3 mode input voltage reference, and the second operating mode when the modified 2/3 mode output voltage reference is higher than the 2/3 mode input voltage reference.

Example 12. The method of example 11, wherein the modified 2/3 mode output voltage reference is given by a 2/3 mode output voltage reference associated with the current source rectifier minus the inductor voltage reference.

Example 13. The method of any one of examples 2 to 12, further comprising: obtaining the current references associated with the current source rectifier and the current references associated with the current source inverter based on output voltage references, measured output voltages, measured input voltages and measured load currents.

Example 14. The method according to any of examples 1 to 13, wherein the current source converter further comprises an input filter configured to be connected between the current source rectifier and a power source, and an output filter configured to be connected between the current source inverter and a load.

Example 15. The method according to example 13 and 14, wherein the measured input voltages represent voltages available at the input filter.

Example 16. The method according to example 13 and 14, wherein the measured output voltages represent voltages available at the output filter.

Example 17. The method of any one of examples 1 to 16, wherein the current source rectifier comprises three rectifier stages each connected between a respective one of three input nodes and the output of the current source rectifier, wherein operating the current source rectifier in the 2/3 mode comprises operating two of the rectifier stages in a PWM mode and operating one of the rectifier stages in a static mode, wherein operating the two of the rectifier stages in the PWM mode comprises changing a switching state of each of the two rectifier stages at least once in each of a plurality of successive drive cycles, and wherein operating the one of the rectifier stages in the static mode comprises maintaining a switching state of the one rectifier stage throughout a plurality of successive drive cycles.

Example 18. The method of any one of the preceding examples, wherein each of the rectifier stages comprise a half-bridge with a high-side switch and a low-side switch, and wherein operating a rectifier stage in the PWM mode comprises changing a switching state of either the high-side switch or the low-side switch at least once in each of the plurality of successive drive cycles.

Example 19. The method of any one of the preceding examples, wherein the current source inverter comprises three inverter stages each connected between the input of the current source inverter and a respective one of three output nodes of the current source inverter, wherein operating the current source inverter in the 2/3 mode comprises operating two of the inverter stages in a PWM mode and operating one of the inverter stages in a static mode, wherein operating the two of the inverter stages in the PWM mode comprises changing a switching state of each of the two inverter stages at least once in each of a plurality of successive drive cycles, and wherein operating the one of the inverter stages in the static mode comprises maintaining a switching state of the one inverter stage throughout a plurality of successive drive cycles.

Example 20. The method of example 16, wherein each of the inverter stages comprise a half-bridge with a high-side switch and a low-side switch, and wherein operating an inverter stage in the PWM mode comprises changing a switching state of either the high-side switch or the low-side switch at least once in each of the plurality of successive drive cycles.

Example 21. A controller configured to detect an operating state of a current source converter that comprises a current source rectifier, a current source inverter, and an inductor circuit connected between an output of the current source rectifier and an input of the current source inverter, and dependent on the detected operating state, operate the current source converter in a first operating mode or a second operating mode, wherein operating the current source converter in the first operating mode comprises operating the current source rectifier in a 2/3 mode an operating the current source inverter in a 3/3 mode, and wherein operating the current source converter in the second operating mode comprises operating the current source inverter in the 2/3 mode an operating the current source rectifier in the 3/3 mode.

Example 22. A current source converter, comprising: a current source rectifier configured to receive input voltages and input currents at input nodes; a current source inverter configured to provide output currents at output nodes; an inductor circuit connected between an output of the current source rectifier and an input of the current source inverter; and a controller according to example 17.

Example 23. The current source converter according to example 22, further comprising a input filter configured to be connected between the current source rectifier and a power source.

Example 24. The current source converter according to example 23, wherein the rectifier comprises three rectifier stages, and wherein the input filter comprises three LC circuits each connected to a respective one of the rectifier stages.

Example 24. The current source converter according to example 24, wherein each of the LC circuits includes a capacitor connected between a respective one of the rectifier stages and a first common circuit node.

Example 25. The current source converter according to any one of examples 22 to 24, further comprising an output filter configured to be connected between the current source rectifier and a load.

Example 26. The current source converter according to example 25, wherein the current source inverter comprises three inverter stages and wherein the output filter includes three capacitors each connected between a respective one of the inverter stages and a second common circuit node.

The invention claimed is:

1. A method comprising:
    detecting an operating state of a current source converter, the current source converter comprising a current source rectifier, a current source inverter, and an inductor circuit connected between an output of the current source rectifier and an input of the current source inverter, and
    dependent on the detected operating state, switching between operating the current source converter in a first operating mode and a second operating mode,
    wherein operating the current source converter in the first operating mode comprises operating the current source rectifier in a 2/3 mode and operating the current source inverter in a 3/3 mode, and
    wherein operating the current source converter in the second operating mode comprises operating the current source inverter in the 2/3 mode and operating the current source rectifier in the 3/3 mode.

2. The method according to claim 1, wherein detecting the operating state comprises obtaining a 2/3 mode reference associated with the current source rectifier based on current references associated with the current source rectifier and obtaining a 2/3 mode reference associated with the current source inverter based on current references associated with the current source inverter, and wherein the operating state is dependent on a relationship between the 2/3 mode reference associated with the current source rectifier and the 2/3 mode reference associated with the current source inverter.

3. The method of claim 2, wherein the 2/3 mode reference associated with the current source rectifier is a 2/3 mode output current reference,
    wherein the 2/3 mode reference associated with the current source inverter is a 2/3 mode input current reference, and
    wherein the current source converter is operated in:
        i) the first operating mode when the 2/3 mode output current reference is greater than the 2/3 mode input current reference, and
        the second operating mode when the 2/3 mode output current reference is less than the 2/3 mode input current reference.

4. The method of claim 3, wherein the 2/3 mode output current reference of the current source rectifier, at each time, equals the magnitude of the one of the current references of the current source rectifier that has the highest magnitude, and
    wherein the 2/3 mode input current reference associated with the current source inverter, at each time, equals the magnitude of the one of the current references associated with the current source inverter that has the highest magnitude.

5. The method of claim 2, wherein the 2/3 mode reference associated with the current source rectifier is a 2/3 mode output voltage reference,
    wherein the 2/3 mode reference associated with the current source inverter is a 2/3 mode input voltage reference, and
    wherein the current source converter is operated in:
        i) the first operating mode when the 2/3 mode output voltage reference is less than the 2/3 mode input voltage reference and
        ii) the second operating mode when the 2/3 mode output voltage reference is greater than the 2/3 mode input voltage reference.

6. The method according to claim 1, wherein detecting the operating state comprises:
    obtaining a modified 2/3 mode reference associated with one of the current source rectifier and the current source inverter based on current references associated with the one of the current source rectifier and the current source inverter and an inductor voltage reference; and
    obtaining a 2/3 mode reference associated with the other one of the current source rectifier and the current source inverter, and
    wherein the operating state is dependent on a relationship between the modified 2/3 mode reference and the 2/3 mode reference.

7. The method of claim 6, wherein the modified 2/3 mode reference associated with the current source inverter is a modified 2/3 mode input current reference and the 2/3 mode reference associated with the current source rectifier is a 2/3 mode output current reference, and
    wherein the current source converter is operated in:
        i) the first operating mode when the 2/3 mode output current reference is grater than the modified 2/3 mode input current reference, and
        ii) the second operating mode when the 2/3 mode output current reference is less than the modified 2/3 mode input current reference.

8. The method of claim 6, wherein the modified 2/3 mode reference associated with the current source inverter is a modified 2/3 mode input voltage reference and the 2/3 mode reference associated with the current source rectifier is a 2/3 mode output voltage reference, and
    wherein the current source converter is operated in:
        i) the first operating mode when the 2/3 mode output voltage reference is less than the modified 2/3 mode input voltage reference, and
        ii) the second operating mode when the 2/3 mode output voltage reference is greater than the modified 2/3 mode input voltage reference.

9. The method of claim 1 further comprising:
    obtaining the current references associated with the current source rectifier and the current references associated with the current source inverter based on output voltage references, measured output voltages, measured input voltages and measured load currents.

10. The method of claim 1, wherein the current source rectifier comprises three rectifier stages each connected between a respective one of three input nodes and the output of the current source rectifier,
    wherein operating the current source rectifier in the 2/3 mode comprises operating two of the rectifier stages in a PWM mode and operating one of the rectifier stages in a static mode;

wherein operating the two of the rectifier stages in the PWM mode comprises changing a switching state of each of the two rectifier stages at least once in each of a plurality of successive drive cycles, and wherein operating the one of the rectifier stages in the static mode comprises maintaining a switching state of the one rectifier stage throughout a plurality of successive drive cycles.

11. The method of claim 10, wherein each of the rectifier stages comprise a half-bridge with a high-side switch and a low-side switch, and wherein operating a rectifier stage in the PWM mode comprises changing a switching state of either the high-side switch or the low-side switch at least once in each of the plurality of successive drive cycles.

12. The method of claim 1, wherein the current source inverter comprises three inverter stages each connected between the input of the current source inverter and a respective one of three output nodes of the current source inverter, wherein operating the current source inverter in the 2/3 mode comprises operating two of the inverter stages in a PWM mode and operating one of the inverter stages in a static mode, wherein operating the two of the inverter stages in the PWM mode comprises changing a switching state of each of the two inverter stages at least once in each of a plurality of successive drive cycles, and wherein operating the one of the inverter stages in the static mode comprises maintaining a switching state of the one inverter stage throughout a plurality of successive drive cycles.

13. The method of claim 12, wherein each of the inverter stages comprise a half-bridge with a high-side switch and a low-side switch, and wherein operating an inverter stage in the PWM mode comprises changing a switching state of either the high-side switch or the low-side switch at least once in each of the plurality of successive drive cycles.

14. A controller operative to:

detect an operating state of a current source converter that comprises a current source rectifier, a current source inverter, and an inductor circuit connected between an output of the current source rectifier and an input of the current source inverter; and dependent on the detected operating state, operate the current source converter in a first operating mode or a second operating mode, wherein operating the current source converter in the first operating mode comprises operating the current source rectifier in a 2/3 mode an operating the current source inverter in a 3/3 mode, and wherein operating the current source converter in the second operating mode comprises operating the current source inverter in the 2/3 mode an operating the current source rectifier in the 3/3 mode.

15. A current source converter comprising:

a current source rectifier operative to receive input voltages and input currents at input nodes;

a current source inverter operative to provide output currents at output nodes;

an inductor circuit connected between an output of the current source rectifier and an input of the current source inverter; and a controller according to claim 14.

* * * * *